(12) United States Patent
McCann et al.

(10) Patent No.: US 7,848,767 B2
(45) Date of Patent: Dec. 7, 2010

(54) METHODS AND SYSTEMS FOR MIGRATING BETWEEN APPLICATION LAYER MOBILE SIGNALING PROTOCOLS

(75) Inventors: Thomas M. McCann, Morrisville, NC (US); Raghavendra G. Rao, Cary, NC (US)

(73) Assignee: Tekelec, Morrisville, NC (US)

( * ) Notice: Subject to any disclaimer, the term of this patent is extended or adjusted under 35 U.S.C. 154(b) by 1644 days.

(21) Appl. No.: 10/405,859

(22) Filed: Apr. 2, 2003

(65) Prior Publication Data

US 2004/0219935 A1 Nov. 4, 2004

Related U.S. Application Data

(60) Provisional application No. 60/418,881, filed on Oct. 15, 2002.

(51) Int. Cl.
*H04W 4/02* (2009.01)
(52) U.S. Cl. .................. 455/466; 370/352; 370/475; 455/408; 455/412.1; 455/417; 455/435.1; 455/445
(58) Field of Classification Search .............. 455/466, 455/433, 435.2, 408, 412.1, 417, 435.1, 445; 370/352, 475
See application file for complete search history.

(56) References Cited

U.S. PATENT DOCUMENTS

| | | |
|---|---|---|
| 4,310,727 A | 1/1982 | Lawser |
| 4,754,479 A | 6/1988 | Bicknell et al. |
| 5,089,954 A | 2/1992 | Rago |
| 5,237,604 A | 8/1993 | Ryan |
| 5,247,571 A | 9/1993 | Kay et al. |
| 5,251,248 A | 10/1993 | Tokunaga et al. |
| 5,400,390 A | 3/1995 | Salin |
| 5,420,916 A | 5/1995 | Sekiguchi |
| 5,422,941 A | 6/1995 | Hasenauer et al. |

(Continued)

FOREIGN PATENT DOCUMENTS

EP 0 512 962 A2 11/1992

(Continued)

OTHER PUBLICATIONS

Bertrand, "Jambala Mobility Gateway-Convergence and Inter-System Roaming," Ericsson Review, p. 89-93, (1999).

(Continued)

*Primary Examiner*—Gerald Gauthier
(74) *Attorney, Agent, or Firm*—Jenkins, Wilson, Taylor & Hunt, P.A.

(57) ABSTRACT

Methods and systems for migrating between application layer mobile signaling protocols are disclosed. For subscribers of multiple protocols, the registration status is tracked in one or more of the protocols. When a location query message for a subscriber of multiple protocols is received, it is determined whether the subscriber is registered according to the tracked protocol. If the subscriber is registered according to the tracked protocol and the request originated from an MSC of the tracked protocol, the message is routed to an HLR of the tracked protocol. If the subscriber is not registered according to the tracked protocol, a response is formulated to the first message. The response optionally includes a prefix that directs the originating MSC to route the call to an MSC of the non-tracked protocol.

25 Claims, 23 Drawing Sheets

U.S. PATENT DOCUMENTS

| | | |
|---|---|---|
| 5,423,068 A | 6/1995 | Hecker |
| 5,430,719 A | 7/1995 | Weisser, Jr. |
| 5,442,683 A | 8/1995 | Hoogeveen |
| 5,455,855 A | 10/1995 | Hokari |
| 5,457,736 A | 10/1995 | Cain et al. |
| 5,475,732 A | 12/1995 | Pester, III |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,579,372 A | 11/1996 | Aström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,812,639 A | 9/1998 | Bartholomew et al. |
| 5,819,178 A | 10/1998 | Cropper |
| 5,822,694 A | 10/1998 | Coombes et al. |
| 5,832,382 A | 11/1998 | Alperovich |
| 5,841,854 A | 11/1998 | Schumacher et al. |
| 5,852,660 A | 12/1998 | Lindquist et al. |
| 5,854,982 A | 12/1998 | Chambers et al. |
| 5,862,481 A | 1/1999 | Kulkarni et al. |
| 5,867,788 A | 2/1999 | Joensuu |
| 5,878,347 A | 3/1999 | Joensuu et al. |
| 5,878,348 A | 3/1999 | Foti |
| 5,889,849 A | 3/1999 | Ban et al. |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichanie et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,094,578 A | 7/2000 | Purcell et al. |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,134,441 A | 10/2000 | Äström et al. |
| 6,137,806 A | 10/2000 | Martinez |
| 6,138,007 A | 10/2000 | Bharatia |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,175,743 B1 * | 1/2001 | Alperovich et al. .......... 455/466 |
| 6,178,181 B1 | 1/2001 | Glitho |
| 6,192,242 B1 | 2/2001 | Rollender |
| 6,205,210 B1 | 3/2001 | Rainey et al. |
| 6,208,870 B1 * | 3/2001 | Lorello et al. ............... 455/466 |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,292,669 B1 * | 9/2001 | Meuronen et al. ........... 455/466 |
| 6,298,232 B1 * | 10/2001 | Marin et al. ................ 455/413 |
| 6,308,075 B1 | 10/2001 | Irten et al. |
| 6,324,279 B1 | 11/2001 | Kalmanek et al. |
| 6,327,350 B1 | 12/2001 | Spangler et al. |
| 6,338,140 B1 | 1/2002 | Owens et al. |
| 6,356,529 B1 | 3/2002 | Zarom |
| 6,363,431 B1 | 3/2002 | Hammer et al. |
| 6,377,674 B1 | 4/2002 | Chong et al. |
| 6,377,807 B1 | 4/2002 | Iparrea et al. |
| 6,411,632 B2 | 6/2002 | Lindgren et al. |
| 6,421,674 B1 | 7/2002 | Yoakum et al. |
| 6,424,832 B1 | 7/2002 | Britt et al. |
| 6,434,127 B1 | 8/2002 | Ha |
| 6,453,174 B1 | 9/2002 | Cunningham et al. |
| 6,463,055 B1 | 10/2002 | Lupien et al. |
| 6,493,551 B1 | 12/2002 | Wang et al. |
| 6,505,046 B1 | 1/2003 | Baker |
| 6,512,926 B1 * | 1/2003 | Henry-Labordere ........ 455/445 |
| 6,515,997 B1 | 2/2003 | Feltner et al. |
| 6,519,242 B1 | 2/2003 | Emery et al. |
| 6,519,468 B1 * | 2/2003 | Donovan et al. ............ 455/466 |
| 6,529,524 B1 | 3/2003 | Liao et al. |
| 6,535,746 B1 * | 3/2003 | Yu et al. ..................... 455/466 |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,577,723 B1 | 6/2003 | Mooney |
| 6,594,258 B1 | 7/2003 | Larson et al. |
| 6,611,516 B1 * | 8/2003 | Pirkola et al. ............... 370/352 |
| 6,615,037 B1 | 9/2003 | Bharatia et al. |
| 6,625,461 B1 * | 9/2003 | Bertacchi ..................... 455/466 |
| 6,643,511 B1 | 11/2003 | Rune et al. |
| 6,662,017 B2 * | 12/2003 | McCann et al. ............. 455/461 |
| 6,683,881 B1 | 1/2004 | Mijares et al. |
| 6,684,073 B1 | 1/2004 | Joss et al. |
| 6,697,620 B1 * | 2/2004 | Lamb et al. ................ 455/432.1 |
| 6,731,926 B1 | 5/2004 | Link, II et al. |
| 6,738,636 B2 | 5/2004 | Lielbriedis |
| 6,745,041 B2 * | 6/2004 | Allison et al. ............... 455/466 |
| 6,795,701 B1 | 9/2004 | Baker et al. |
| 6,801,781 B1 * | 10/2004 | Provost et al. .............. 455/466 |
| 6,819,932 B2 * | 11/2004 | Allison et al. ............... 455/466 |
| 6,826,397 B1 * | 11/2004 | Vasa .......................... 455/417 |
| 6,836,477 B1 | 12/2004 | West, Jr. et al. |
| 6,850,768 B2 * | 2/2005 | Foll ............................. 455/466 |
| 6,865,191 B1 * | 3/2005 | Bengtsson et al. .......... 370/475 |
| 6,885,872 B2 | 4/2005 | McCann et al. |
| 6,912,389 B2 * | 6/2005 | Bright et al. ................ 455/433 |
| 6,917,612 B2 | 7/2005 | Foti et al. |
| 6,950,441 B1 | 9/2005 | Kaczmarczyk et al. |
| 6,993,038 B2 | 1/2006 | McCann |
| 7,035,239 B2 | 4/2006 | McCann et al. |
| 7,043,002 B2 | 5/2006 | Delaney et al. |
| 7,079,524 B2 | 7/2006 | Bantukul et al. |
| 7,079,853 B2 | 7/2006 | Rathnasabapathy et al. |
| 7,092,505 B2 | 8/2006 | Allison et al. |
| 7,113,800 B2 * | 9/2006 | Linkola ...................... 455/466 |
| 7,145,875 B2 * | 12/2006 | Allison et al. ............ 370/230.1 |
| 7,181,194 B2 * | 2/2007 | McCann et al. ............. 455/408 |
| 7,190,959 B2 * | 3/2007 | Palmer et al. ............... 455/445 |
| 7,221,952 B2 | 5/2007 | Cho et al. |
| 7,257,401 B1 * | 8/2007 | Dizdarevic et al. ........ 455/432.1 |
| 7,286,839 B2 | 10/2007 | McCann et al. |
| 2001/0006897 A1 * | 7/2001 | Kang et al. .................. 455/466 |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0046856 A1 | 11/2001 | McCann |
| 2002/0132636 A1 * | 9/2002 | Stockhusen ................. 455/553 |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2003/0003930 A1 * | 1/2003 | Allison et al. ............... 455/466 |
| 2003/0007482 A1 | 1/2003 | Khello et al. |
| 2003/0016684 A1 | 1/2003 | Prasad et al. |
| 2003/0026289 A1 | 2/2003 | Mukherjee et al. |
| 2003/0054844 A1 | 3/2003 | Anvekar et al. |
| 2003/0061234 A1 | 3/2003 | Ali et al. |
| 2003/0065788 A1 | 4/2003 | Salomaki |
| 2003/0109271 A1 | 6/2003 | Lewis et al. |
| 2003/0157938 A1 * | 8/2003 | Haase et al. ................. 455/445 |
| 2003/0193967 A1 | 10/2003 | Fenton et al. |
| 2003/0227899 A1 | 12/2003 | McCann |

| | | | |
|---|---|---|---|
| 2004/0076126 | A1 | 4/2004 | Qu et al. |
| 2004/0081206 | A1 | 4/2004 | Allison et al. |
| 2004/0082332 | A1 | 4/2004 | McCann et al. |
| 2004/0087300 | A1 | 5/2004 | Lewis |
| 2004/0125925 | A1 | 7/2004 | Marsot |
| 2004/0142707 | A1 | 7/2004 | Midkiff et al. |
| 2004/0198351 | A1 | 10/2004 | Knotts |
| 2004/0202187 | A1 | 10/2004 | Kelly et al. |
| 2004/0219935 | A1 | 11/2004 | McCann et al. |
| 2004/0246965 | A1 | 12/2004 | Westman et al. |
| 2004/0264674 | A1 | 12/2004 | Delaney et al. |
| 2005/0003838 | A1 | 1/2005 | McCann et al. |
| 2005/0119017 | A1 | 6/2005 | Lovell et al. |
| 2005/0238048 | A1 | 10/2005 | Delaney et al. |
| 2006/0067338 | A1 | 3/2006 | Hua et al. |
| 2006/0098621 | A1 | 5/2006 | Plata et al. |
| 2006/0136557 | A1 | 6/2006 | Schaedler et al. |
| 2006/0281492 | A1 | 12/2006 | Jiang |
| 2007/0061397 | A1 | 3/2007 | Gregorat et al. |
| 2007/0066326 | A1* | 3/2007 | Agarwal et al. ............. 455/466 |
| 2007/0133574 | A1 | 6/2007 | Tejani et al. |
| 2007/0207802 | A1 | 9/2007 | Palmer et al. |
| 2007/0254681 | A1* | 11/2007 | Horvath et al. ............. 455/466 |
| 2008/0248820 | A1* | 10/2008 | Lohtia ........................ 455/466 |
| 2009/0191904 | A1* | 7/2009 | Hronek et al. ............. 455/466 |
| 2009/0227276 | A1 | 9/2009 | Agarwal et al. |

FOREIGN PATENT DOCUMENTS

| | | |
|---|---|---|
| EP | 0 788 283 A2 | 8/1997 |
| EP | 0 936 825 A3 | 8/1999 |
| EP | 0 944 276 A1 | 9/1999 |
| EP | 1 558 004 A | 7/2005 |
| EP | 1 742 452 A1 | 1/2007 |
| EP | 1 950 942 A1 | 7/2008 |
| KR | 10-2004-0107271 A | 12/2004 |
| WO | WO 95/12292 A1 | 5/1995 |
| WO | WO 96/11557 | 4/1996 |
| WO | WO 97/33441 A1 | 9/1997 |
| WO | WO 98/56195 | 12/1998 |
| WO | WO 99/11087 A2 | 3/1999 |
| WO | WO 99/57926 | 11/1999 |
| WO | WO 00/16583 A1 | 3/2000 |
| WO | WO 01/47297 A2 | 6/2001 |
| WO | WO 01/48981 A1 | 7/2001 |
| WO | WO 01/54444 A1 | 7/2001 |
| WO | WO 02/060192 A2 | 8/2002 |
| WO | WO 03/021982 A1 | 3/2003 |
| WO | WO 03/0105382 A1 | 12/2003 |
| WO | WO 2004/006534 | 1/2004 |
| WO | WO 2004/0087686 A | 1/2004 |
| WO | WO 2004/075507 | 9/2004 |
| WO | WO 2004/102345 A2 | 11/2004 |
| WO | WO 2005/002311 A2 | 1/2005 |
| WO | WO 2005/013538 A3 | 2/2005 |
| WO | WO 2006/072473 A1 | 7/2006 |
| WO | WO 2007/045991 A1 | 4/2007 |
| WO | WO 2007/064943 A2 | 6/2007 |
| WO | WO 2007/092205 A2 | 8/2007 |
| WO | WO 2007/095379 A2 | 8/2007 |
| WO | WO 2007/146257 A2 | 12/2007 |
| WO | WO 2008/157213 A2 | 12/2008 |
| WO | WO 2009/023573 A2 | 2/2009 |

OTHER PUBLICATIONS

International Search Report in PCT Application No. 03/32626 (Mar. 5, 2004).
Notice of Allowance and Fee(s) Due for U.S. Appl. No. 11/706,837 (May 27, 2010).
Communication Pursuant to Article 94(3) EPC for European Application No. 06844747.7 (May 11, 2010).
Commonly-assigned, co-pending U.S. Appl. No. 12/732,178 for "Methods, Systems, and Computer Readable Media for Providing Home Subscriber Server (HSS) Proxy," (Unpublished, filed on Mar. 25, 2010).
Final Official Action for U.S. Appl. No. 11/291,502 (Feb. 4, 2010).
"Diameter (Protocol)," Wikipedia, pp. 1-8 (Document last modified on Jan. 16, 2010).
Final Official Action for U.S. Appl. No. 11/706,837 (Dec. 15, 2009).
Interview Summary for U.S. Appl. No. 11/706,837 (Oct. 26, 2009).
Communication pursuant to Article 94(3) EPC for European application No. 06844747.3 (Jul. 28, 2009).
Official Action for U.S. Appl. No. 11/706,837 (May 13, 2009).
Official Action for U.S. Appl. No. 11/291,502 (May 13, 2009).
Supplementary European Search Report for European Application No. 06844747.3 (Apr. 24, 2009).
3GPP, "Digital Cellular Telecommunications System (Phase 2+); Universal Mobile Telecommunications System (UMTS); LTE; IP Multimedia (IM) Subsystem Cx and Dx Interfaces; Signalling Flows and Message Contents," ETSI TS 129 228 V8.4.0 (Jan. 2009).
Notification Concerning Transmittal of International Preliminary Report on Patentability for International Application No. PCT/US2006/046108 (Oct. 2, 2008).
Notification of Transmittal of the International Search Report and the Written Opinion of the International Searching Authority, or the Declaration for International Application No. PCT/US2006/046108 (Sep. 9, 2008).
Official Action for U.S. Appl. No. 11/706,837 (Jul. 29, 2008).
Communication of European publication No. and information on the application of Article 67(3) EPC for Application No. 06844747.3 (Jul. 23, 2008).
Notification of Transmittal of the International Search Report and the Written Opinion of the International Searching Authority, or the Declaration for International Application No. PCT/US07/04175 (Jul. 22, 2008).
"IP Multimedia Subsystem," printout from wikipedia.org, Wikimedia Foundation, Inc. (May 29, 2007).
Supplementary European Search Report for European application No. 04 756 094.1 (Mar. 29, 2007).
"HP OperCall Home Subscriber Server Software—Data Sheet", 4AA0-3360ENW Rev. 2, Hewlett-Packard Development Company, L.P. (Jul. 2006).
Camarillo et al., "The Session Initiation Protocol (SIP) P-User-Database Private-Header (P-Header)," Network Working Group, RFC 4457, pp. 1-8 (Apr. 2006).
Liu et al., "Introduction to Diameter," IBM, pp. 1-12 (Jan. 24, 2006).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).
Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 for Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Moodie, "Agilent acceSS7: White Paper," Agilent Technologies, pp. 1-14 (Apr. 1, 2003).
"Cisco IP Transfer Point," Cisco Systems, Inc., pp. 1-10 (Copyright 1992-2003).
"Cisco IP Transfer Point Multilayer Short Message Serivce Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).

Barry, "A Signal for Savings," Packet, Cisco Systems Users Magazine, vol. 14, No. 4, pp. Cover; 19-21; and 81 (Fourth Quarter 2002).

"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

The attached email dated Oct. 20, 2001 and PowerPoint presentation dated Oct. 24, 2001 disclose an MSISDN-based auto-provisioning solution proposed by a customer of the assignee of the presend application.

"Agilent acceSS7 Business intelligence," Agilent Technologies, pp. 1-6 (Copyright 2001-Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

Rockhold, "Or," Wireless Review, p. 22, 23, 26, 28, 30, 32, (Aug. 15, 2000).

"Topsail Beach-SS7 Over IP-" Cisco Systems, Inc., pp. 1-16 (Copyright 1999).

ETSI, "Digital Cellular Telecommunications Systems (Phase 2+) ; Support of Mobile No. Portability (MNP); Technical Realisation; Stage 2," Global System for Mobile Communications, p. 1-71, (1998).

Smith, "Number Portability Pileup," Telephony, p. 22, 24, 26, (Jan. 6,1997).

Jain et al., "Phone Number Portability for PCS Systems with ATM Backbones Using Distributed Dynamic Hashing," IEEE, Vol. 15 (No. 1), p. 96-105, (Jan. 1997).

Heinmiller, "Generic Requirements for SCP Application and GTT Function for No. Portability," Illinois Number Portability Workshop, p. 1-50, (Sep. 4, 1996).

International Telecommunication Union, "Series Q: Switching and Signalling: Specifications of Signalling Systems No. 7-Signalling Connection Control Part," p. 11-16, (Jul. 1996).

Rice, "SS7 Networks in a PCS World," Telephony, pp. 138, 140 142, 144, 146, (Jun. 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Signaling Requirements for Number Portability," AT&T Network Systems, No. 1, p. 1-75, (Feb. 2, 1996).

ETSI, Digital Cellular Telecommunications System (Phase 2+); Milbe Application Part (MAP) Specification, Global System for Mobile Communications, pp. 112-114 (1996).

Jain, et al., "A Hashing Scheme for Phone No. Portability in PCS Systems with ATM Backbones," Bell Communications Research, p. 593-597, (1996).

Bishop, "Freeing the Network for Competition," Telecommunications, p. 75-80, (Apr. 1995).

Anonymous, "Zeichengabesysteme-Eine neue Generation für ISDN und Intelligente Netze," Zeichengabesystem, Medien-lnstitut Bremen, p. iz-xi; 170-176, (Feb. 17, 1995).

Giordano et al., "PCS Number Portability," IEEE, p. 1146-1150, (Sep. 1994).

Bellcore, "Signaling Transfer Point (STP) Generic Requirements," Bell Communications Research, No. 1, p. ii-xxii, 4-84-J14, (Jun. 1994).

Telcordia Technologies, "CCS Network interface Specification (CCSNIS) Supporting SCCP and TCAP," Bell Communications Research, p. ii-xii, 1-1—C-22, (Mar. 1994).

Buckles, "Very High Capacity Signaling Trnsfer Point for Intelligent Network Servcies," DSC Communciations Corporation, p. 1308-1311, (1988).

"Diameter Overview," referenced from www.ulticom.com/htm/products/signalware-diameter-reference-guide.asp (Publication date unknown).

"Chapter 1: Overview," SS7 Port Adapter Installation and Configuration, pp. 1-1-1-8 (Publication Date Unknown).

"Configuring ITP Basic Functionally," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

* cited by examiner

US 7,848,767 B2

METHODS AND SYSTEMS FOR MIGRATING BETWEEN APPLICATION LAYER MOBILE SIGNALING PROTOCOLS

RELATED APPLICATIONS

This application claims the benefit of U.S. Provisional Patent Application Ser. No. 60/418,881, filed Oct. 15, 2002, the disclosure of which is incorporated herein by reference in its entirety.

TECHNICAL FIELD

The present invention relates to methods and systems for migrating between application layer mobile signaling protocols. More particularly, the present invention relates to methods and systems for routing and processing signaling messages for calls and short message service (SMS) messages to mobile subscribers in a network where some subscribers have two or more different application layer mobile signaling protocol subscriptions and the same directory number is used to contact the subscriber in each subscription.

RELATED ART

In mobile communications networks, a variety of different mobile signaling protocols are used to route calls, obtain subscriber information, and deliver SMS messages to mobile subscribers. For example, in North America, American National Standards Institute (ANSI)-41 or Interim Standard (IS)-41 is the dominant application layer mobile signaling protocol. In Europe, the Global System for Mobile communications (GSM) protocol is the dominant application layer mobile signaling protocol. GSM is also being increasingly used in North America.

In some networks, a mobile telecommunications service provider that was initially an IS-41-only service provider may desire to add GSM service. Alternatively, a GSM-only service provider may desire to add IS-41 service. In order to add a new type of service, the service provider must add signaling nodes, such as mobile switching centers (MSCs), visitor location registers (VLRs), and home location registers (HLRs) of the new service type. In addition, short message service centers (SMSCs) of the new service type may be required. Alternatively, short message service centers capable of communicating using protocols of the existing and new service types can be provided.

In a network that includes GSM and IS-41 network elements, some mechanism must exist for ensuring that signaling messages relating to calls directed to IS-41 subscribers are delivered to the appropriate IS-41 network elements and that signaling messages relating to calls intended for GSM subscribers are routed to the appropriate GSM network elements. This problem becomes quite complex in a network in which some subscribers are IS-41-only, others have multiple subscriptions, and still others are GSM-only. In a situation where a subscriber adds a new service or migrates to a different type of service, the subscriber may desire to keep the same directory number. Because the same directory number can be associated with different subscriptions, the processing and routing of mobile signaling messages in such an environment becomes even more complex.

Conventional solutions to routing messages for calls from a subscriber of one application layer mobile signaling protocol to a subscriber of a different application layer mobile signaling protocol include simply converting each message from one application layer mobile signaling protocol to another application layer mobile signaling protocol and vice-versa. Converting each message from one protocol to the other protocol and vice-versa greatly increases the time required to set up calls and increases the number of signaling messages in the network. In addition, conventional protocol converters are incapable of giving priority to one service type for dual mode subscribers and properly routing calls to dual mode subscribers.

Accordingly, in light of these difficulties associated with conventional protocol converters, there exists a need for improved methods and systems for processing signaling messages relating to calls and SMS messages to dual mode subscribers of different application layer mobile signaling protocols and for giving priority to one signaling protocol over the other signaling protocol.

DISCLOSURE OF THE INVENTION

The present invention includes methods and systems for routing and processing signaling messages in a network with dual mode subscribers of different application layer mobile signaling protocols. As used herein, the term "dual mode subscriber" refers to a mobile subscriber with two different application layer mobile signaling protocol subscriptions where the same directory number is used to contact the subscriber via each subscription. For example, a dual mode subscriber may have an IS-41 phone and a GSM phone with the same directory number being used to contact both phones. Alternatively, the subscriber may have a single physical device capable of operating in IS-41 and GSM modes.

A method for processing signaling messages relating to calls to dual mode subscribers according to the present invention may include tracking the registration status of a dual mode subscriber in one of the application layer mobile signaling protocols of the subscriber (hereinafter, "the tracked application layer mobile signaling protocol") and using the current registration status to route calls and SMS messages to the subscriber in a manner that gives priority to the tracked application layer mobile signaling protocol. For example, location query messages for dual mode subscribers may be processed in a manner that gives priority to the tracked application layer mobile signaling protocol. If a mobile switching center (MSC) of the tracked application layer mobile signaling protocol sends a location query message for a dual mode subscriber, a routing node of the present invention may check the registration status of the dual mode subscriber. If the subscriber is not registered according to the tracked application layer mobile signaling protocol, the routing node may formulate a location query response message with a prefix corresponding to a mobile switching center of the non-tracked application layer mobile signaling protocol and send the location query response to the requesting mobile switching center. The prefix in the location query response message may trigger the requesting mobile switching center to route the call to the mobile switching center of the non-tracked application layer mobile signaling protocol.

If the location query message originates from an MSC of the tracked application layer mobile signaling protocol and the subscriber is registered according to the tracked application layer mobile signaling protocol, the routing node routes the message to an HLR of the tracked application layer mobile signaling protocol. By tracking the subscriber's registration status in one protocol and routing messages based on the registration status in that protocol, the present invention gives priority to the tracked application layer mobile signaling protocol over the non-tracked application layer mobile signaling protocol. For example, registration messages of the non-tracked application layer mobile signaling protocol preferably do not affect the subscriber's registration status in the tracked application layer mobile signaling protocol. This fact combined with the routing mechanisms described above ensure that the tracked application layer mobile signaling protocol is given priority over the non-tracked application layer mobile signaling protocol.

In networks where dual mode subscribers have separate mobile handsets for each application layer mobile signaling protocol subscription, the present invention preferably only tracks the registration status in one of the application layer mobile signaling protocols, thereby giving priority to the tracked application layer mobile signaling protocol. In networks in which dual mode subscribers have dual mode devices capable of receiving calls from either subscription, the present invention preferably tracks the registration status in both application layer mobile signaling protocols. The exemplary call flows illustrated herein are essentially the same whether the subscriber's registration status is tracked in one or more of the application layer mobile signaling protocols. Differences in the call flows for single handset and dual handset cases will be described below.

According to another aspect, the present invention includes a method for routing and processing short message service location query messages in a network with dual mode subscribers. When a mobile subscriber initiates a short message service message to another mobile subscriber in the network, the short message service message is sent to a short message service center to be stored and later forwarded to the destination mobile subscriber. The short message service center initiates a request for SMS routing information formatted in the tracked application layer mobile signaling protocol, independently of the mobile signaling protocol of the sender. If the intended recipient is a dual mode subscriber, the current registration status of the dual mode subscriber is checked. If the intended recipient is registered in the tracked application layer mobile signaling protocol, the request for SMS routing information is sent to a home location register of the tracked layer mobile signaling protocol. If the intended receipt is not registered in the tracked application layer mobile signaling protocol, an error message is sent to the SMSC, and the SMSC sends a request for SMS routing information in the non-tracked application layer mobile signaling protocol.

Accordingly, it is an object of the invention to provide methods and systems for routing signaling messages associated with calls and SMS messages to subscribers having subscriptions of both first and second application layer mobile signaling protocols.

It is another object of the invention to provide methods and systems for routing messages relating to calls and SMS messages to dual mode subscribers of different application layer mobile signaling protocols in a manner that gives priority to one of the application layer mobile signaling protocols.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
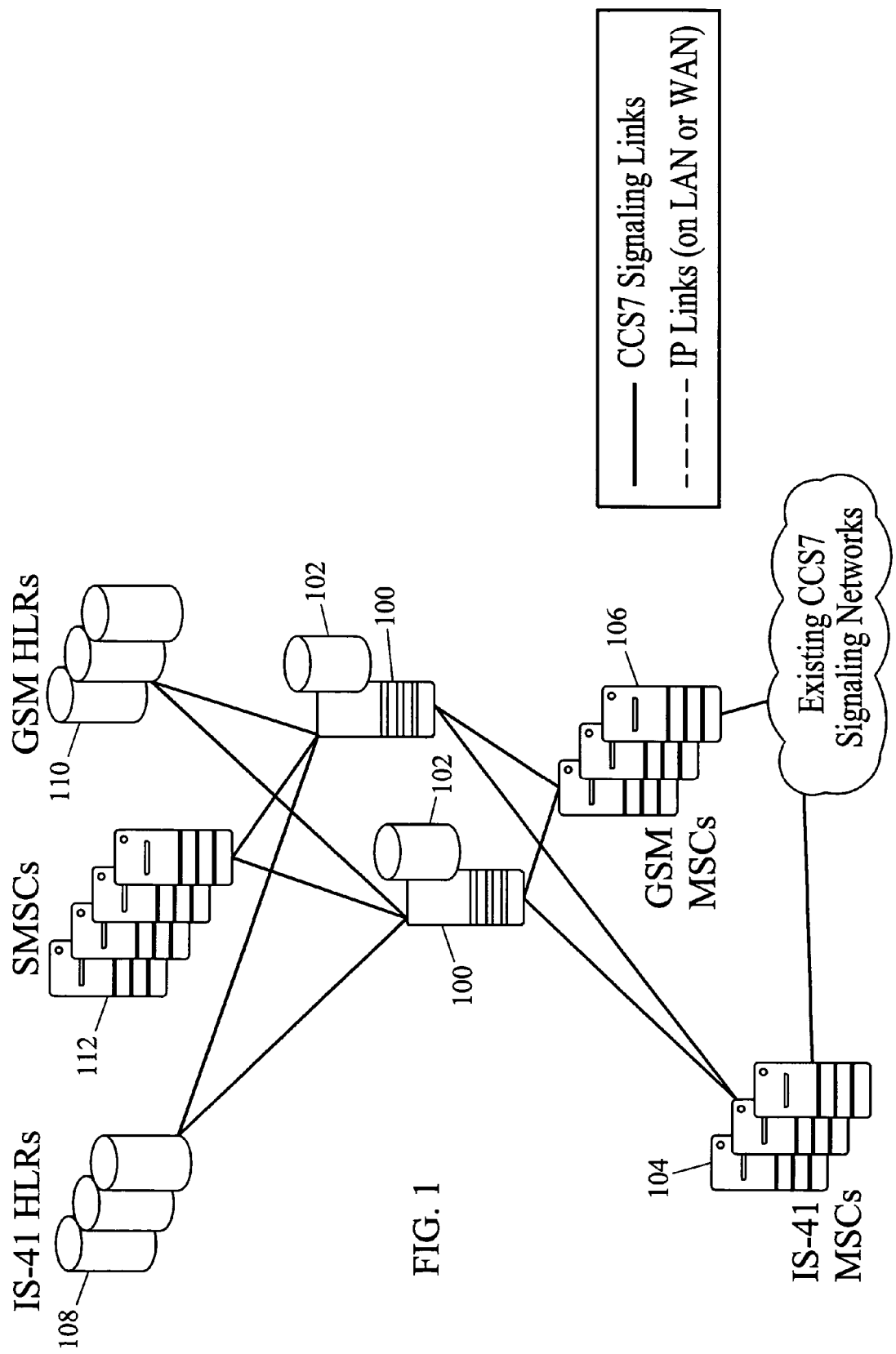
FIG. 1 is a network diagram illustrating an exemplary network in which the methods and systems for migrating between application layer mobile signaling protocols may be implemented.

In one exemplary embodiment of the invention, a number migration signaling platform may track the registration status of dual mode subscribers of different application layer mobile signaling protocols in one of the application layer mobile signaling protocols and process and route signaling messages based on the tracked registration status. A number migration signaling platform may be implemented in a signaling message routing node for routing messages between MSCs, HLRs, VLRs, and SMSCs. FIG. 1 illustrates an exemplary network architecture in which a number migration signaling platform according to the present invention may be used. Referring to FIG. 1, number migration signaling platforms 100 are provided to route and process mobile call signaling messages between other mobile network elements. Each number migration signaling platform 100 may include a location query routing and subscriber registration status database 102 for tracking registration status of dual mode subscribers in one application layer mobile signaling protocol, for routing location query messages to the appropriate destination using the tracked registration status, and for formulating location query response messages. The functionality of number migration signaling platforms 100 and databases 102 will be described in more detail below.

In the illustrated embodiment, number migration signaling platforms 100 may function as a mated pair for reliability purposes. Number migration signaling platforms 100 may be centrally located in the network for routing messages to and from IS-41 MSCs 104, GSM MSCs 106, IS-41 HLRs 108, GSM HLRs 110, and SMSCs 112. In the illustrated example, number migration signaling platforms 100 are connected to network elements 104, 106, 108, 110, and 112 via SS7 signaling links. Alternatively, number migration signaling platforms 100 may be connected to network elements 104, 106, 108, 110 and 112 via IP signaling links.

Figure 2:
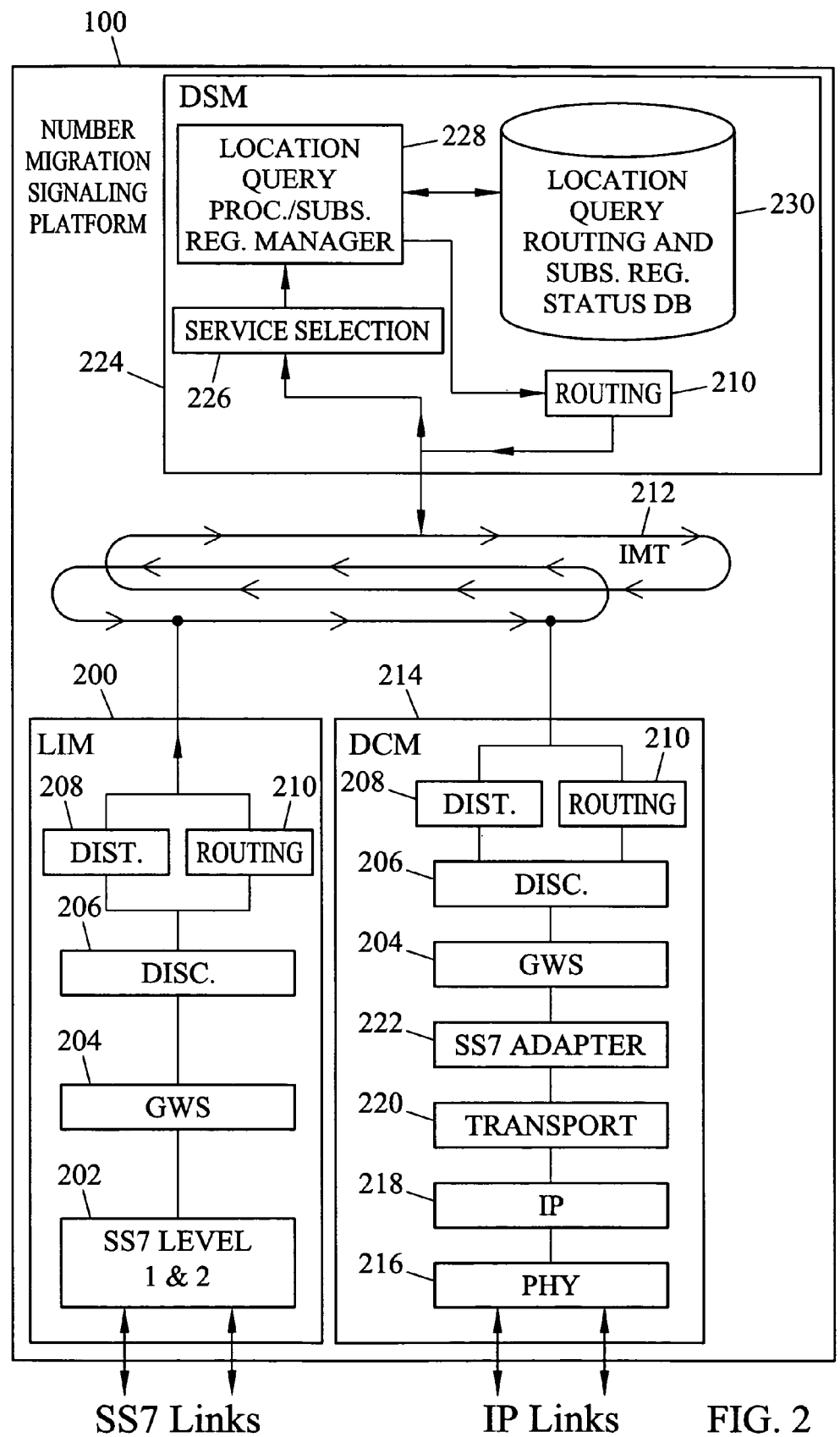
FIG. 2 is a block diagram illustrating an exemplary internal architecture for a number migration signaling platform according to an embodiment of the present invention.

FIG. 2 is a block diagram illustrating an exemplary internal architecture for a number migration signaling platform according to an embodiment of the present invention. Referring to FIG. 2, number migration signaling platform 100 includes a plurality of internal processing modules connected to each other via an internal network or bus. Each of the internal processing modules may include a printed circuit board with an application processor for performing application layer functions and a communications processor for communicating with other modules via the internal bus. One type of processing module that may be included within number migration signaling platform 100 is a link interface module 200. Link interface module 200 may send and receive messages via SS7 signaling links and may forward messages to other modules within number migration signaling platform 100 for further processing or routing.

In the illustrated example, link interface module 200 includes an SS7 level 1 and 2 module 202 for performing SS7 level 1 and 2 functions, such as error correction, error detection, and sequencing of SS7 messages. Gateway screening module 204 screens messages to determine whether to allow the messages into the network. Discrimination module 206 determines whether a received SS7 message should be distributed to an internal processing module within number migration signaling platform 100 for further processing or whether the message should be routed over an external signaling link. Distribution module 208 distributes messages identified by discrimination module 206 as requiring further processing. Routing module 210 routes messages identified by discrimination module 206 as requiring routing. Both routing module 210 and distribution module 208 may forward messages to other processing modules via an inter-processor message transport (IMT) bus 212.

In the illustrated example, number migration signaling platform 100 includes a data communications module (DCM) 214 for sending and receiving SS7 messages via IP signaling links. Data communications module 214 may include gateway screening, message discrimination, message distribution, and message routing modules similar to those described with respect to link interface module 200. In addition, data communications module 214 may include a physical layer 216 for performing physical layer functions for sending and receiving messages over IP signaling links. In one exemplary embodiment, physical layer 216 may be implemented using an Ethernet interface. IP layer 218 performs network layer functions for sending and receiving messages via IP signaling links, such as IP forwarding based on destination IP addresses. Transport layer 220 performs functions for providing reliable transfer of SS7 messages over IP signaling links. For example, transport layer 220 may be implemented using the transmission control protocol (TCP) or the stream control transmission protocol (SCTP). SS7 adaptation layer 222 performs functions for adapting SS7 messages for transport over an IP network. SS7 adaptation layer 222 may be implemented using Tekelec's transport adapter layer interface (TALI), MTP level two user adaptation layer (M2UA), MTP level three user adaptation layer (M3UA), SCCP signaling adaptation layer (SUA), and/or MTP level two peer to peer user adaptation layer (M2PA), as described in the correspondingly named IETF Internet drafts and RFCs.

According to an important aspect of the invention, number migration signaling platform 100 may include a database services module 224 for tracking registration status of dual mode subscribers and for routing and processing location query messages using the registration status. In the illustrated example, database services module 224 includes a service selection module 226 for selecting the appropriate service for a received message, a location query processor/subscriber registration manager 228 for processing location query messages and tracking subscriber registration information, a location query routing and subscriber registration status database 230, and a routing function 210. In networks where dual mode subscribers have separate handsets for different signaling protocol subscriptions, location query processor/subscriber registration manager 228 preferably tracks only the subscriber registration status in one application layer mobile signaling protocol. For example, location query processor/subscriber registration manager 228 may track the GSM registration status of a subscriber of both IS-41 and GSM service. In an alternate embodiment, location query processor/subscriber registration manager 228 may track IS-41 registration status of such a subscriber. In networks in which subscribers have dual mode devices, location query processor/subscriber registration manager 228 preferably tracks the registration status in both application layer mobile signaling protocols.

While in the embodiment illustrated in FIG. 2 location query processor/subscriber registration manager 228 and database 230 are located on a database services module, the present invention is not limited to such an embodiment. In an alternate embodiment, location query processor/subscriber registration manager 228 and/or database 230 may be located on a communication link module, such as link interface module 200 or data communications module 214. In yet another alternate embodiment, location processor/subscriber registration manager 228 may be located on a separate computing platform from number migration signaling platform 100. In such an embodiment, the separate computing platform may be connected to number migration signaling platform 100 via a local area network.

Table 1 shown below illustrates exemplary data that may be maintained in location query routing and subscriber registration status database 230.

TABLE 1

Routing and Registration Status Information

| IMSI (MIN) | MSISDN | DPC/ SSN | Portability Type | GSM Registration Status | VLR ID |
|---|---|---|---|---|---|
| — | 9194938000 | 1-1-1/4 | Dual | Registered | 1234 |
| 9194938000 | — | 1-1-2/4 | Dual | Registered | — |
| — | 9194938001 | 1-1-1/4 | Dual | Not registered | — |
| 9194938001 | — | 1-1-2/4 | Dual | Not registered | 5678 |
| — | 9194938002 | 1-1-1/4 | GSM-only, not in IS-41 range | — | — |
| — | 9194938003 | 1-1-1/4 | GSM-only, in IS-41 range | — | — |
| 9194938004 | — | 1-1-2/4 | IS-41 only | — | — |

Referring to Table 1, each entry includes either an MSISDN number or an IMSI that corresponds to an MSISDN number or IMSI and a received location query message. For received GSM messages, the MSISDN fields in Table 1 are searched using the MSISDN numbers extracted from the messages. For received IS-41 messages, the IMSI fields in Table 1 are searched using the mobile identification number (MIN) or mobile directory number (MDN) extracted from the messages. It should be noted that the same number may occur in the MSISDN field and the IMSI field in the database for a dual mode subscriber. In this case, location query processor/subscriber registration manager 228 may determine the appropriate field to search based, for example, on the received message type or one or more provisioned service selector parameters determined to be present in the received message.

In addition to the IMSI and MSISDN fields, each entry in Table 1 includes a destination point code and subsystem number combination to which the destination point code and the subsystem number and a received message should be translated. The DPC/SSN combination may identify the appropriate HLR for receiving a location query message. Each entry also includes a portability type field that stores the portability type of each subscriber. In the illustrated example, the portability type field indicates whether a subscriber is a dual mode subscriber, a GSM-only subscriber with a directory number within an IS-41 range, a GSM-only subscriber with a directory number that is not within an IS-41 range, or an IS-41-only subscriber.

A GSM subscriber with directory number within an IS-41 range may be an existing IS-41 subscriber who migrates to GSM service and does not keep his or her IS-41 handset. GSM subscribers with directory numbers within an IS-41 range may also include new GSM-only subscribers who are given directory numbers in a range that may result in HLR queries from an IS-41 MSC. GSM-only subscribers with directory numbers outside of IS-41 ranges are assigned directory numbers that will not result in HLR queries from IS-41 MSCs. IS-41-only subscribers are simply subscribers of IS-41 service only.

In addition to user type, the GSM entries in Table 1 for dual mode subscribers may include a populated GSM registration status field. The GSM registration status field indicates whether or not a subscriber is GSM registered. As will be described in further detail below, a subscriber may become GMS registered in response to activation of his or her GSM phone. Registration status is preferably only tracked for dual mode subscribers. For other types of subscribers, this field may be blank. The example illustrated in Table 1 does not store the IS-41 registration status of a mobile subscriber, indicating the preferred configuration for networks in which dual mode subscribers use separate handsets for each subscription. In networks in which dual mode subscribers use the same phone for both subscriptions, the IS-41 registration status may be stored in addition to the GSM registration status in database 230.

Figure 3:
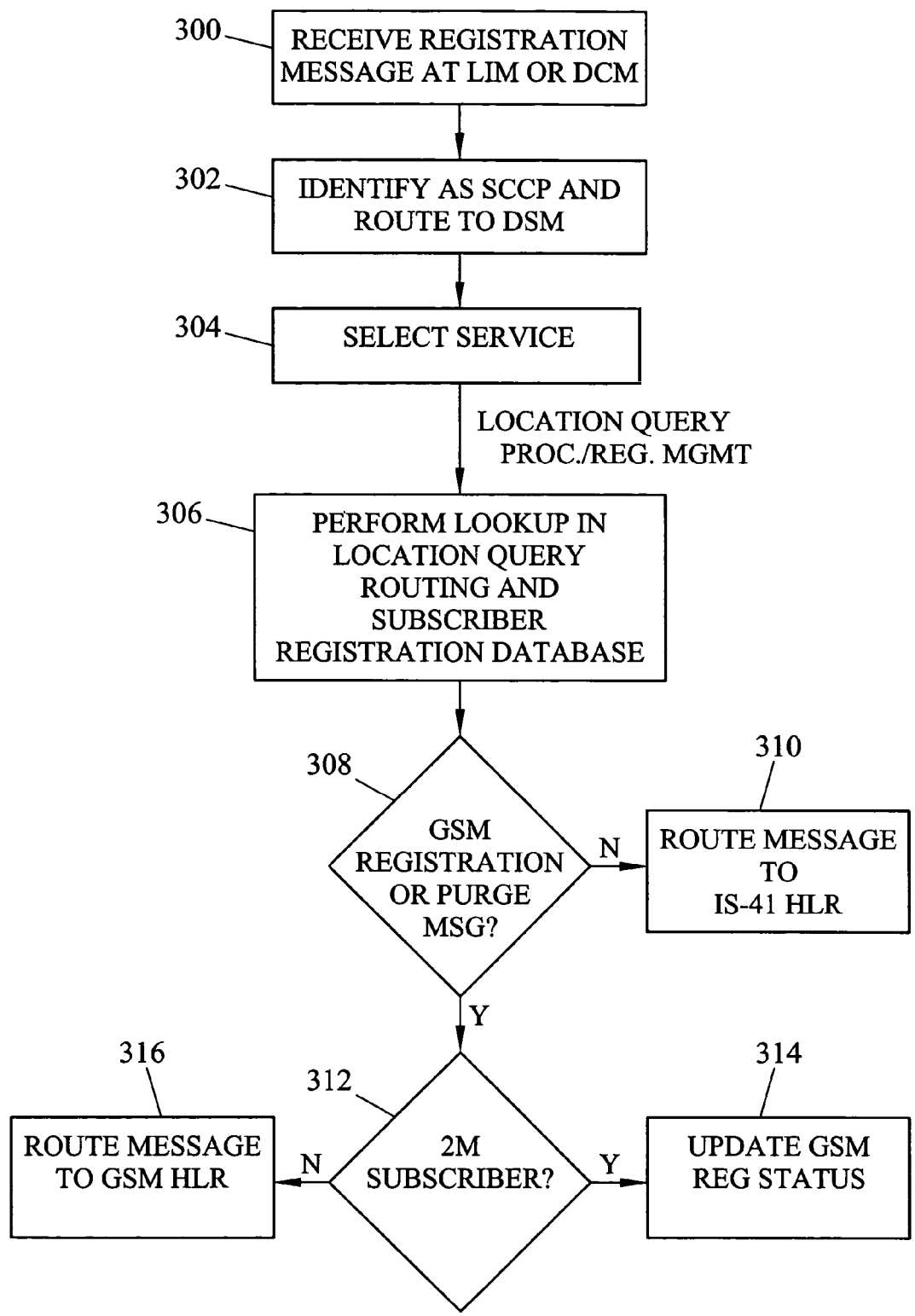
FIG. 3 is a flow chart illustrating exemplary steps that may be performed by a number migration signaling platform in tracking the GSM registration status of a dual mode subscriber according to an embodiment of the present invention.

FIG. 3 is a flow chart illustrating exemplary steps that may be performed by number migration signaling platform 100 in tracking the registration status of dual mode subscribers according to an embodiment of the present invention. Referring to FIG. 3, in step 300, number migration signaling platform 100 receives the message at LIM 200 or DCM 214. In step 302, the message is identified as a signaling connection control part message and is routed to DSM 224. Upon reaching DSM 224, service selection module 226 selects the appropriate service for processing the message. In the illustrated example, the selected service is assumed to be location query processing/registration management because the received message is a registration message. In step 306, location query processor/subscriber registration manager 228 performs a lookup in location query routing and subscriber registration status database 230 based on the MSISDN or MIN number in the received registration message. In step 308, location query processor/subscriber registration manager 228 determines whether the received registration message is a GSM registration or purge message. If the message is not a GSM registration or purge message, control proceeds to step 310 where the message is routed to the appropriate IS-41 HLR. Thus, IS-41 registration messages preferably do not affect the GSM registration status of the subscriber.

If, on the other hand, the message is a GSM registration or purge message, the message relates to the status of a GSM subscriber. Accordingly, control proceeds to step 312 where location query processor/subscriber registration manager 228 determines whether the subscriber is a dual mode subscriber. As stated above, this step may be performed by examining the subscriber type field in database 230. If the subscriber is a dual mode subscriber, control proceeds to step 314 where location query processor/subscriber registration manager 228 updates the registration status for the subscriber in database 230. For example, if the message is a GSM update location message for a dual mode subscriber, location query processor/subscriber registration manager 228 may indicate that the subscriber is GSM registered in database 230. A purge message, or more specifically, a mobile application part (MAP) purge mobile subscriber message, is sent from a VLR to an HLR to cause the HLR to mark its data for the mobile subscriber so that any request for routing information for a mobile terminated call or a mobile terminated SMS message will be treated as if the mobile terminal is not reachable. The purge message is sent when the subscriber record for the mobile subscriber is to be deleted in the VLR, for example, because the GSM mobile handset has been inactive for several days. In order to prevent a subscriber from being de-registered in database 230 by a VLR in a network in which the subscriber is no longer roaming, location query processor/subscriber registration manager 228 may track subscribers based on directory number (DN) and VLR ID. Only purge messages for dual mode subscribers that match the current VLR ID stored in database 228 may be used to update the entry. If the subscriber is not a dual mode subscriber, control proceeds to step 316 where the message is routed to the appropriate GSM HLR.

Thus, as illustrated in FIG. 3, location query processor/subscriber registration manager 228 tracks the GSM registration status of a mobile subscriber based on GSM registration and purge messages and does not change the GSM registration status in response to IS-41 registration messages. As will be described in detail below, this allows calls to be routed to the subscriber's GSM phone with priority over the subscriber's IS-41 phone. In an alternate embodiment of the invention, which may be used in networks in which subscribers use separate phones for different subscriptions and IS-41 is the preferred subscription, the IS-41 registration status, rather than the GSM registration status, may be tracked in order to give priority to the subscriber's IS-41 phone. In yet another alternate embodiment, which may be used in networks in which subscribers use the same phone for multiple subscriptions, the GSM registration status and the IS-41 registration status may be tracked. In networks in which number migration signaling platform 100 tracks both the IS-41 and GSM registration status of a subscriber, the processing steps may be similar to those illustrated in FIG. 3 except that the subscriber status is updated when either a GSM or IS-41 registration message is received. In addition, in dual mode, single handset networks it is not necessary to update the registration status when a GSM purge message is received. Whether a single registration status or multiple registration statuses are tracked will depend on the type of network in which the node is operating, as described above, and is preferably configurable by the service provider.

Figure 4:
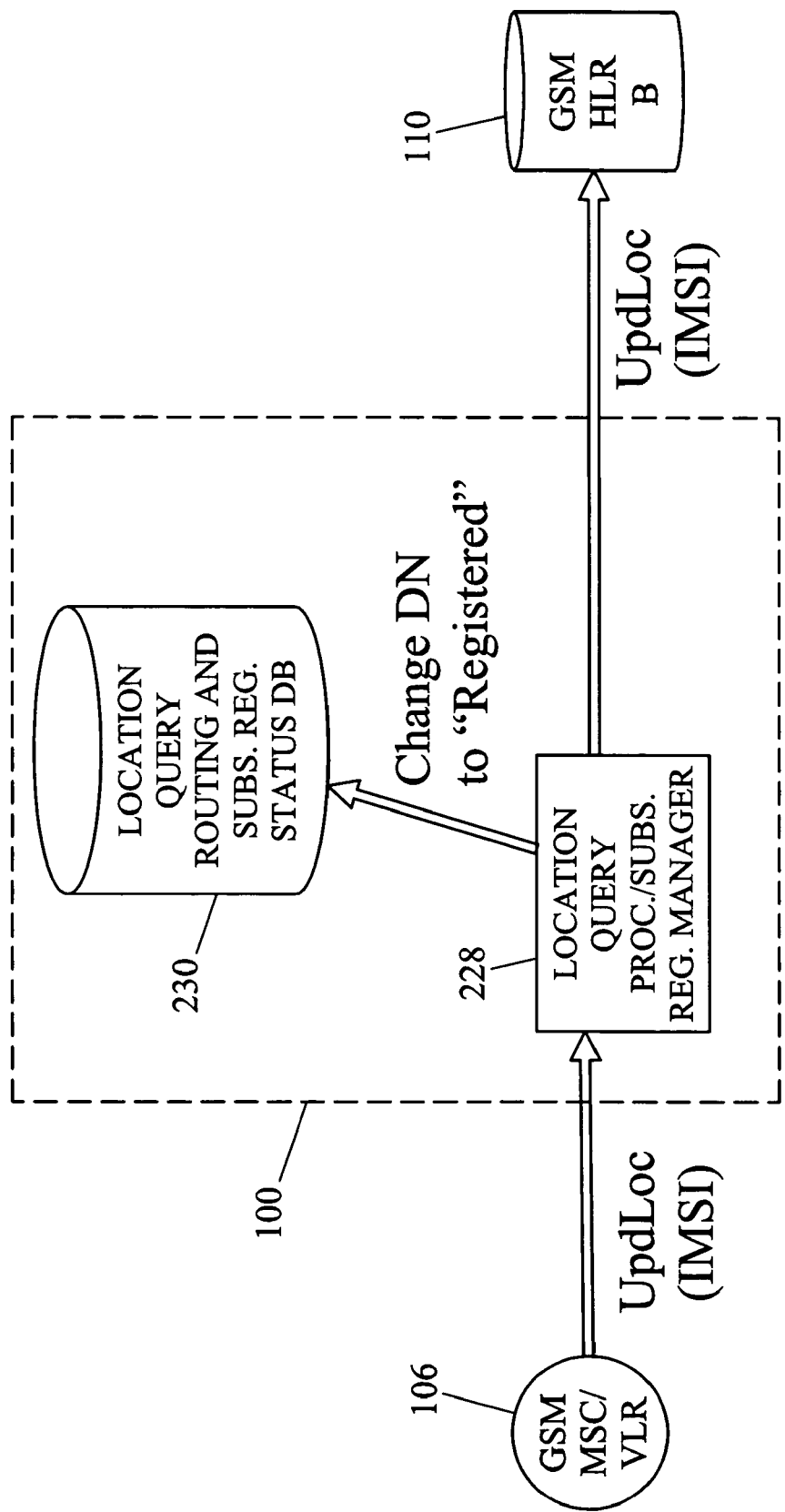
FIG. 4 is a message flow diagram illustrating exemplary messages involved in tracking the registration status of a dual mode subscriber according to an embodiment of the present invention.

FIG. 4 is a message flow diagram illustrating exemplary messages associated with tracking the GSM registration status of a subscriber according to an embodiment of the present invention. Referring to FIG. 4, GSM MSC/VLR 106 initiates an update location message when a dual mode subscriber operates his or her GSM handset in an area corresponding to GSM MSC/VLR 106. GSM MSC/VLR 106 forwards the update locate message to number migration signaling platform 100. Within number migration signaling platform 100, location query processor/subscriber registration manager 228 changes the GSM registration status for the subscriber in database 230 to REGISTERED. Location query processor/subscriber registration manager 228 also translates the destination point code in the message to that of GSM HLR 110 and forwards the update location message to GSM HLR 110. A similar transaction may occur when GSM MSC/VLR 106 detects that the subscriber has left the area managed by GSM MSC/VLR 106. In such a situation, GSM MSC/VLR 106 would send a purge mobile subscriber message to mark the subscriber unreachable in GSM HLR 110. Number migration signaling platform 100 would change the subscriber registration status in database 230 to NOT REGISTERED upon receiving the purge mobile subscriber message that matches the VLR ID corresponding to the entry in database 230.

In order to track only the IS-41 registration status of a subscriber, the message flow would be similar to that illustrated in FIG. 4 except that the registration status in database 230 would be updated in response to receiving an IS-41 registration message from an IS-41 MSC/VLR. In a network in which it is necessary to track the registration status of both IS-41 and GSM subscriptions, the registration status in database 230 would be updated in response to receiving an IS-41 registration message from an IS-41 MSC/VLR or a GSM registration message from a GSM MSC/VLR. In a network in which both registration statuses are tracked, the last received registration message preferably controls the registration status in database 230. For example, if a subscriber is not registered and a GSM registration message is received, the subscriber's registration status in database 230 will be GSM Registered. If an IS-41 registration message is received for the GSM registered subscriber, the subscriber status in database 230 will be changed from GSM Registered to IS-41 Registered. Similarly, if a GSM registration message is received for a subscriber who is IS-41 registered, the subscriber's registration status is preferably changed from IS-41 Registered to GSM Registered.

Figure 5:
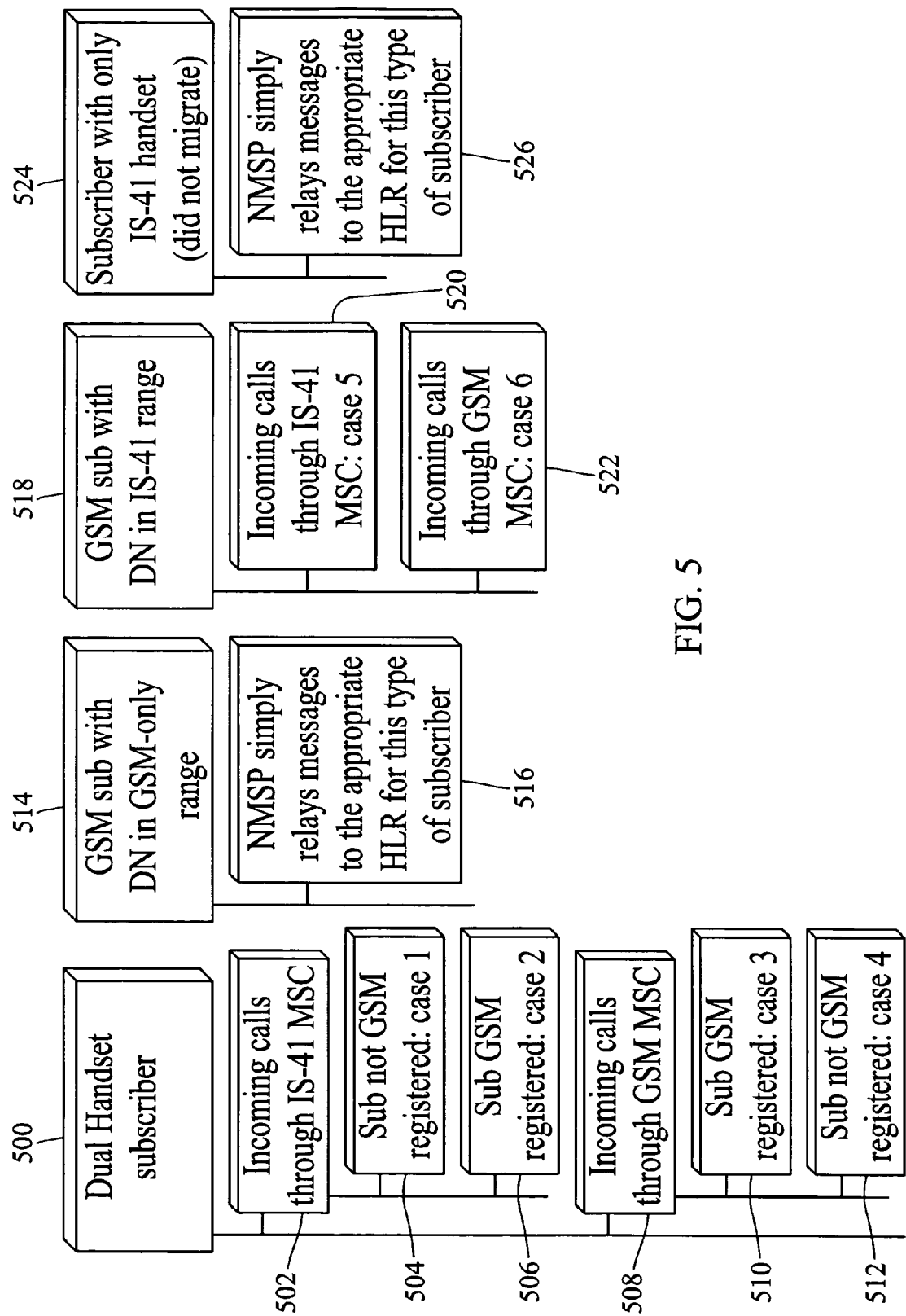
FIG. 5 is a block diagram illustrating mobile terminated call scenarios that may be encountered by a number migration signaling platform according to an embodiment of the present invention.

Once the subscriber's registration status is tracked in database 230, number migration signaling platform 100 may process location query messages for calls to a variety of different subscriber types. FIG. 5 is a block diagram illustrating exemplary mobile terminated call scenarios that may be handled or processed by number migration signaling platform 100 according to an embodiment of the present invention. Referring to FIG. 5, block 500 represents exemplary processing for dual mode subscribers. As stated above, a dual mode subscriber may be an existing IS-41 subscriber who has migrated to GSM and kept the IS-41 service or a new subscriber of both IS-41 and GSM service. Within category 500, incoming calls may originate from an IS-41 MSC, as indicated by block 502. For such cases, processing varies depending on whether or not the subscriber is GSM registered, as indicated by blocks 504 and 506. In addition, calls for dual mode subscribers may originate from a GSM MSC, as indicated by block 508. In this category, the subscriber may be GSM registered, as indicated by block 510, or not GSM registered, as indicated by block 512.

Block 514 represents the category of processing for GSM-only subscribers having directory numbers outside of IS-41 ranges. This category includes new subscribers of GSM service or migrated subscribers who discontinue their IS-41 service. For these subscribers, number migration signaling platform 100 simply relays the messages to the appropriate GSM HLR as indicated by block 516. Category 518 represents processing for GSM subscribers having directory numbers within IS-41 ranges. For example, such subscribers may have migrated to GSM from IS-41 and kept their former IS-41 directory numbers. For such cases, processing varies depending on whether the call originates from an IS-41 MSC as indicated by block 520 or a GSM MSC as indicated by block 522. Finally, block 524 represents exemplary processing for subscribers with only an IS-41 handset who have not migrated to GSM service. In this situation, number migration signaling platform 100 preferably relays the messages to the appropriate IS-41 HLR, as indicated by block 526.

Figure 6:
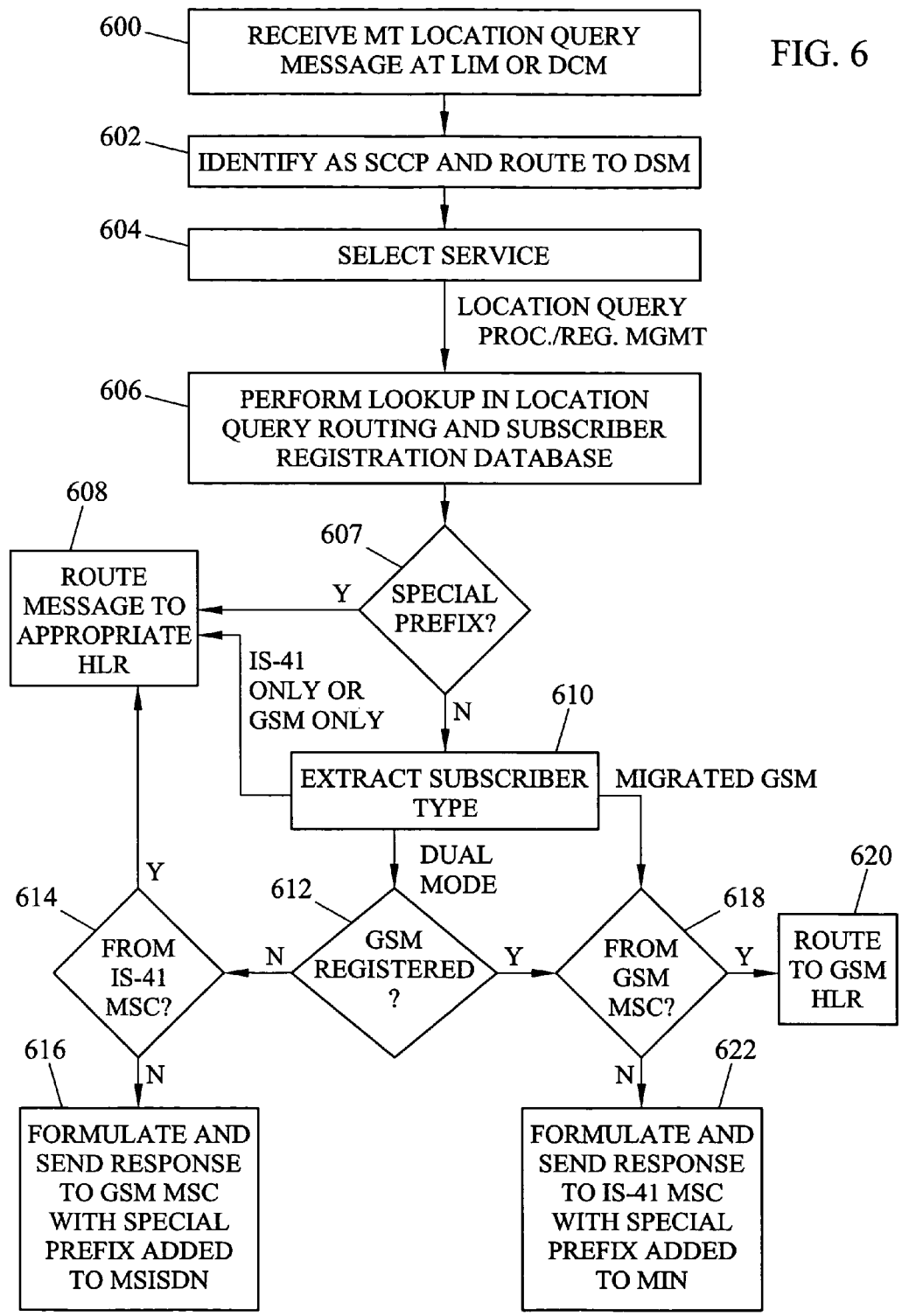
FIG. 6 is a flow chart illustrating exemplary steps that may be performed by a number migration signaling platform in processing location query messages for mobile terminated calls according to an embodiment of the present invention.

FIG. 6 is a flow chart illustrating exemplary processing steps that may be performed by number migration signaling platform 100 in processing location query messages for mobile terminated calls. Referring to FIG. 6, in step 600, number migration signaling platform 100 receives a mobile terminated location query message at LIM 200 or DCM 214. In step 602, the message is identified as an SCCP message and routed to DSM 224. In step 604, service selection module 226 at DSM 224 selects the appropriate service for the message. In this example, the service is assumed to be location query processing/registration management because the message is a location query message. In step 606, location query processor/subscriber registration manager 228 performs a lookup in database 230 using the MSISDN in the message. In step 607, if the MSISDN has a special prefix, the message is routed to the appropriate HLR corresponding to the special prefix/MSISDN combination, as indicated by step 608.

If, however, the message does not include a special prefix, control proceeds to step 610 where location query processor/subscriber registration manager 228 extracts the subscriber type from database 230. If the subscriber is a dual mode subscriber, control proceeds to step 612 where location query processor/subscriber registration manager 228 determines whether the subscriber is GSM registered. If the subscriber is not GSM registered, control proceeds to step 614 where it is determined whether the location query message originated from an IS-41 MSC. If the message originated from an IS-41 MSC, the message is simply routed to the appropriate IS-41 HLR, as indicated by step 608. If the message did not originate from an IS-41 MSC, control proceeds to step 616 where location query processor/subscriber registration manager 228 formulates and sends a response to the GSM MSC that originated the message. The response preferably has a prefix that will be used to route the call to an IS-41 MSC. This prefix is the same prefix used in step 607 to route the message to the appropriate IS-41 HLR. However, the special prefix may be omitted without departing from the scope of the invention. If the prefix is omitted, the GSM MSC may simply route the call to a default IS-41 MSC.

Returning to step 612, for dual mode subscribers, if the subscriber is determined to be GSM registered, control proceeds to step 618 where location query processor/subscriber registration manager 228 determines whether the message originated from a GSM MSC. If the message originated from a GSM MSC, control proceeds to step 620 where the message is routed to the appropriate GSM HLR. If the message did not originate from a GSM MSC, control proceeds to step 622 where location query processor/subscriber registration manager 228 formulates and sends a response to the IS-41 MSC with a special prefix added to the mobile identification number. The special prefix is used to route the call to the appropriate GSM MSC. This is the same special prefix used in step 606 to route the message to the appropriate GSM HLR.

Returning to step 610, if the subscriber is determined to be a GSM subscriber with a directory number within an IS-41 range of directory numbers, control proceeds to step 618 where it is determined whether the location query message is from a GSM MSC. If the message is from a GSM MSC, the message is routed to the appropriate GSM HLR, as indicated in step 620. If the message is not from a GSM MSC, location query processor/subscriber registration manager 228 formulates and sends a response to the IS-41 MSC with a special prefix to direct the IS-41 MSC to route the call to the appropriate GSM MSC. However, in an alternate embodiment of the invention, the prefix may be omitted. If the prefix is omitted, the IS-41 MSC may simply route the call to a GSM MSC by default.

Returning again to step 610, if the subscriber type is determined to be IS-41-only with a directory number within an IS-41 range or GSM-only with a directory number within a GSM range, control proceeds to step 608 where location query processor/subscriber registration manager 228 extracts the appropriate HLR address from database 230 and routing function 210 routes the message to the appropriate IS-41 or GSM HLR. In this example, since the directory numbers are exclusively within IS-41 or GSM ranges, it is assumed that the location query messages originated from the MSC of the appropriate type.

Figure 7:
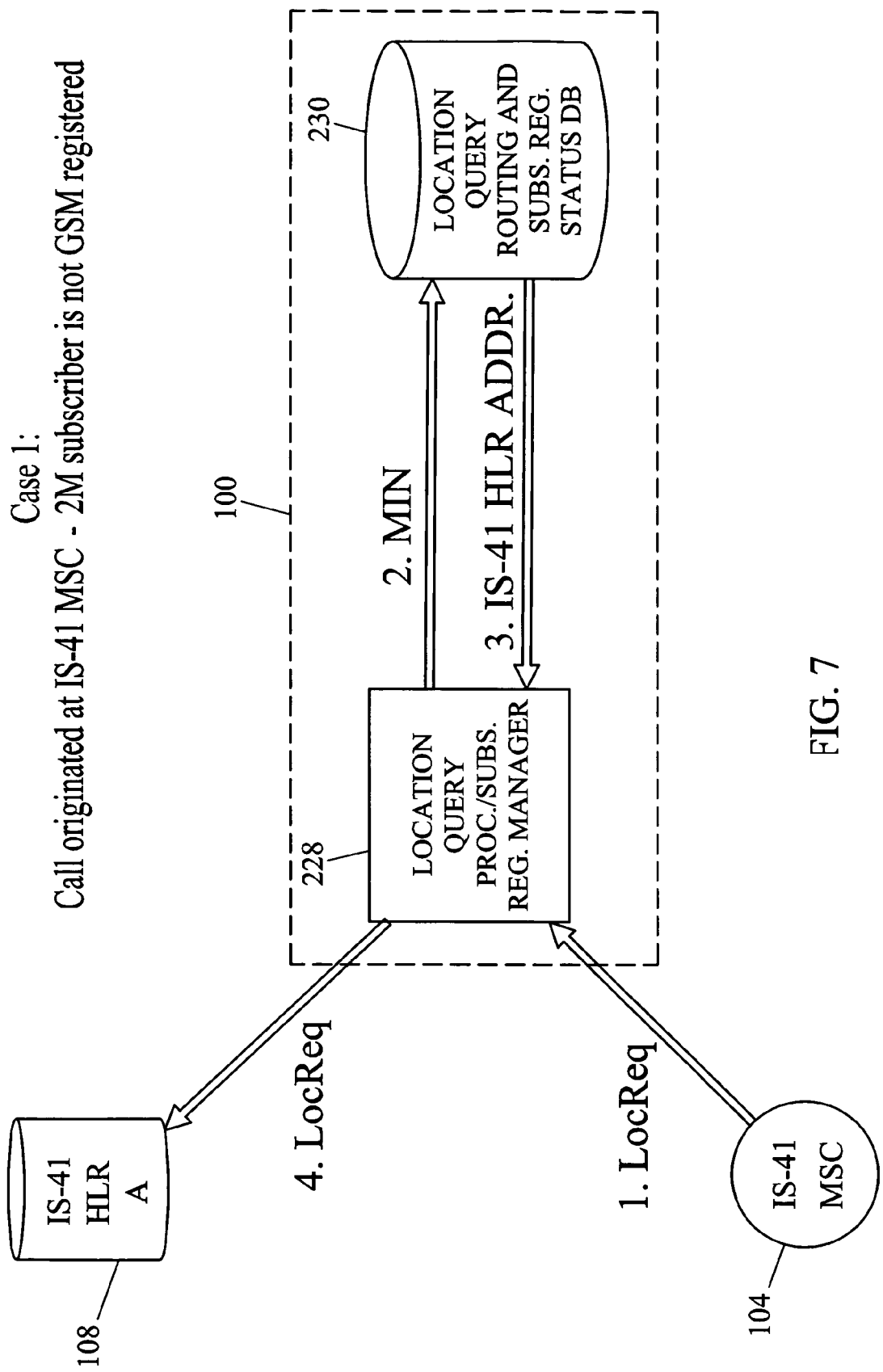
FIG. 7 is a message flow diagram illustrating exemplary messages involved in processing a call originated at an IS-41 MSC for a dual mode subscriber who is not GSM registered according to an embodiment of the present invention.

The processing steps illustrated in FIG. 6 will now be separately explained with regard to each scenario described in FIG. 5 using signaling message flow diagrams. FIG. 7 is a signaling message flow diagram illustrating exemplary signaling messages associated with a call originating from an IS-41 MSC for a dual mode subscriber who is not GSM registered. Referring to FIG. 7, IS-41 MSC 104 initiates an IS-41 location request message and forward the location request message to number migration signaling platform 100. Within numbering migration signaling platform 100, location query processor/subscriber registration manager 228 queries database 230 using the mobile identification number in the location request message. Because the subscriber is a dual mode subscriber, location query processor/subscriber registration manager 228 determines the GSM registration status for a subscriber. Because the subscriber is not GSM registered, location query processor/subscriber registration manager 228 extracts the address of IS-41 HLR 108 from database 230, inserts the address in the message, and routing function 210 routes the message to IS-41 HLR 108.

Figure 8:
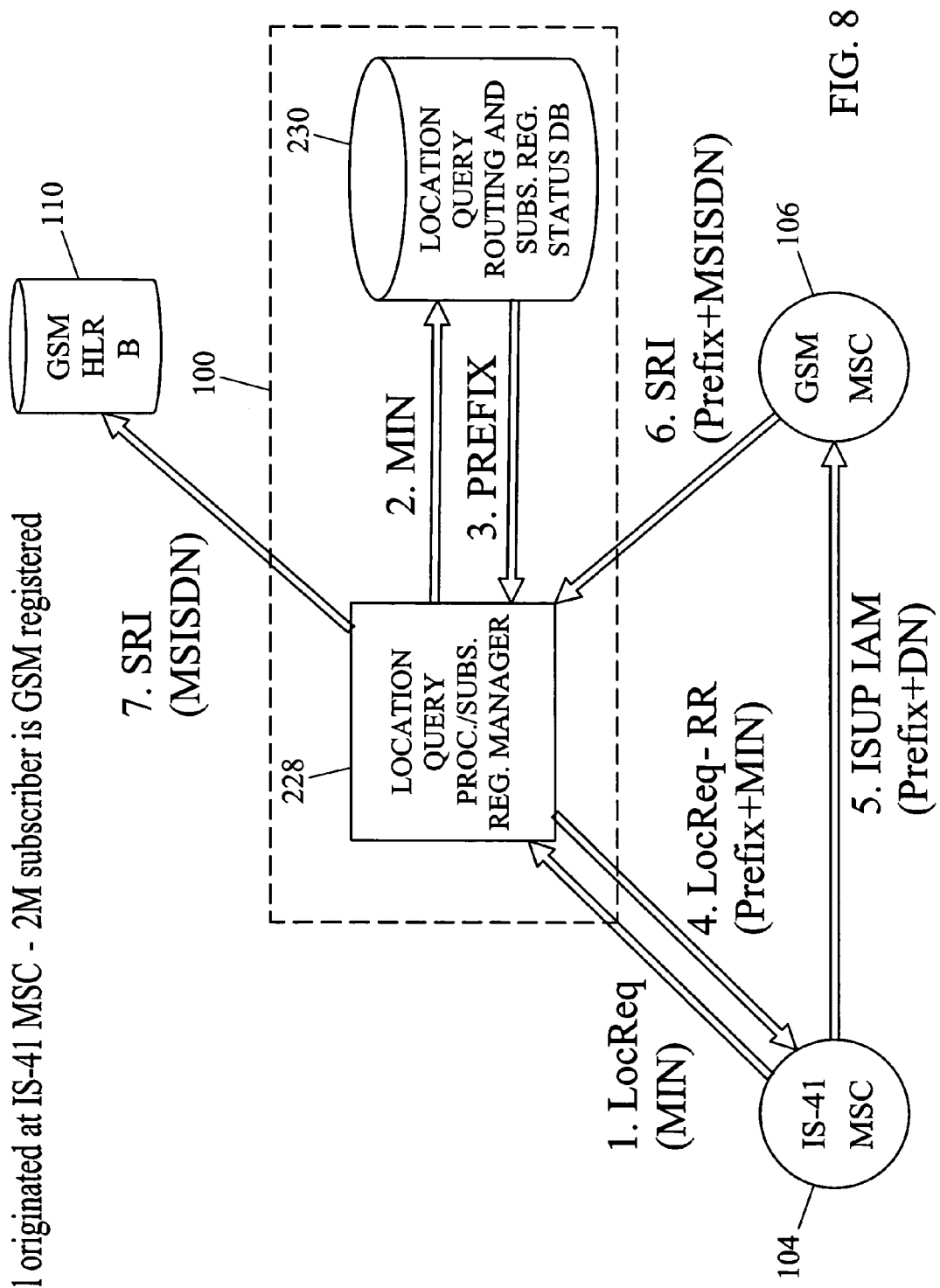
FIG. 8 is a message flow diagram illustrating exemplary messages involved in a call originated at an IS-41 MSC for a dual mode subscriber who is GSM registered according to an embodiment of the present invention.

FIG. 8 is a message flow diagram illustrating exemplary messages associated with a call originating at an IS-41 MSC for a dual mode subscriber who is GSM registered. Referring to FIG. 8, IS-41 MSC 104 initiates a location request message and forwards the location request message to number migration signaling platform 100. Within number migration signaling platform 100, location query processor/subscriber registration manager 228 queries database 230 using the mobile identification number in the location request message determines that the dual mode subscriber is GSM registered. Accordingly, location query processor/subscriber registration manager 228 generates a location request return result message. In the return result message, a special prefix corresponding to GSM MSC 106 may be included. Location query processor/subscriber registration manager 228 then forwards the location request return result message to IS-41 MSC 104. IS-41 MSC 104 routes the call to GSM MSC 106 based on the prefix, if included. If the prefix is not included, IS-41 MSC 104 may route the call to GSM MSC 106 by default.

In response to receiving the IAM message, GSM MSC 106 formulates a send routing information message including the prefix and the MSISDN number of the subscriber. Number migration signaling platform 100 receives the send routing information message, and location query processor/subscriber registration manager 228 queries database 230 using the combination of the prefix and the MSISDN number. The result of the query is the network address of GSM HLR 110. Accordingly, location query processor/subscriber registration manager 228 inserts the address of GSM HLR 110 in the send routing information message, and routing function 210 routes the message to GSM HLR 110. Because the special prefix is included, it is not necessary to determine subscriber type or registration status again. As a result, using the special prefix reduces unnecessary processing and call setup time. However, if the special prefix is not included, number migration signaling platform 100 would still route the SRI message to the appropriate destination because it would follow the procedures for routing a GSM originated location request to a GSM registered dual mode subscriber, as illustrated in FIG. 6.

In the example illustrated in FIG. 8, after receiving the SRI message, if number migration signaling platform 100 determines that the subscriber has been ported to another service provider, number migration signaling platform 100 may return an SRI_ACK message to GSM_MSC 106. The SRI_ACK message may include a prefix corresponding to the GSM MSC currently serving the subscriber. GSM_MSC 106, upon receiving the SRI_ACK message with the prefix, would formulate an ISUP IAM message and forward the IAM message to the serving GSM_MSC. Thus, the present invention may be used to route messages relating to calls, SMS messages, and other services, even when the called party has been ported to another service provider.

Figure 9:
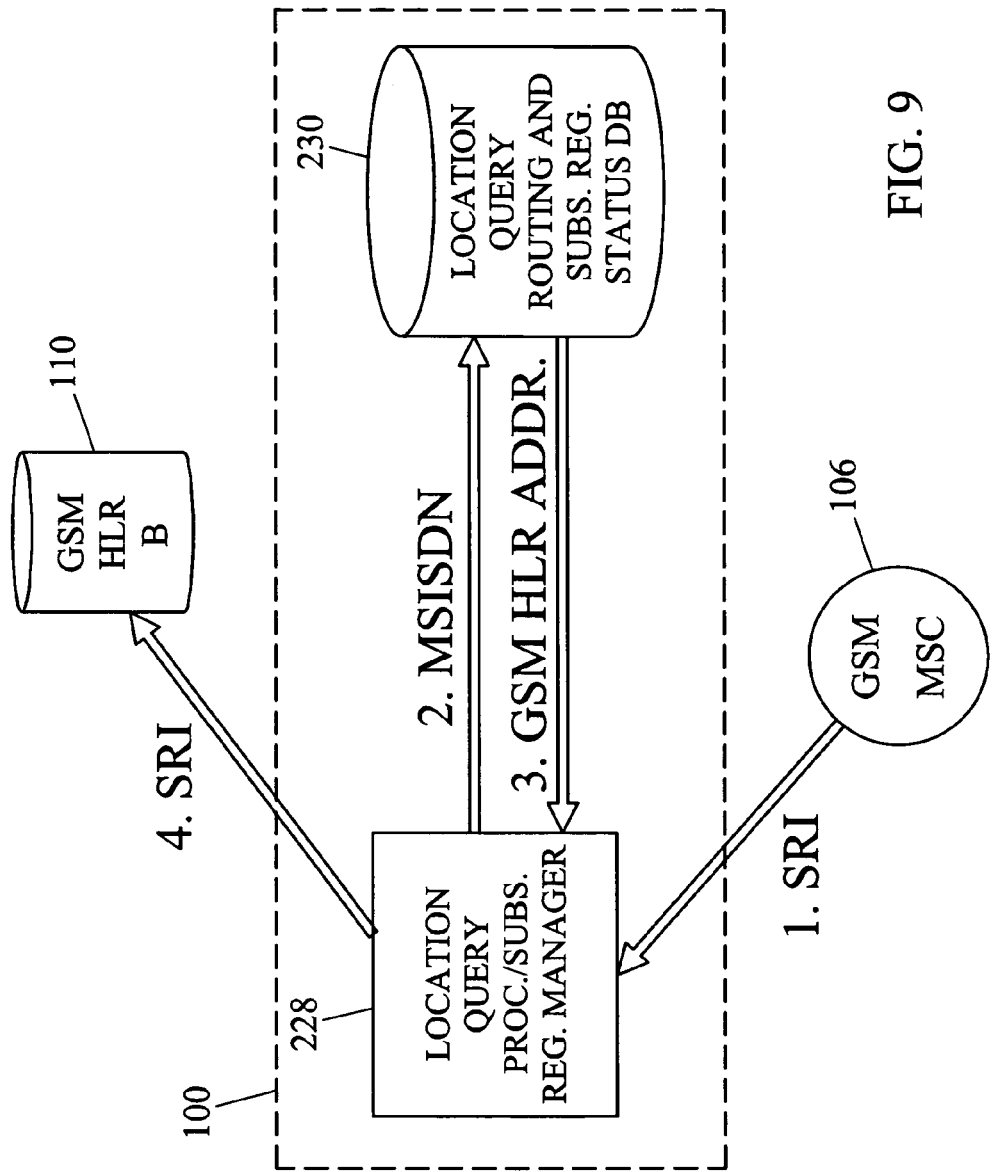
FIG. 9 is a message flow diagram illustrating exemplary messages involved in processing a call originated at a GSM MSC for a dual mode subscriber who is GSM registered according to an embodiment of the present invention.

FIG. 9 illustrates exemplary messaging associated with a call originating at a GSM MSC for a dual mode subscriber who is GSM registered. Referring to FIG. 9, GSM MSC 106 generates a send routing information message and forwards the send routing information message to number migration signaling platform 100. Within number migration signaling platform 100, location query processor/subscriber registration manager 228 queries database 230 using the MSISDN number in the send routing information message. The result of the query is an indication that the subscriber is GSM registered and the address of the appropriate GSM HLR. Accordingly, because the message is an SRI message originating from GSM MSC, location query processor/subscriber registration manager 228 inserts the network address of GSM HLR 110 in the message, and routing function 210 routes the message to GSM HLR 110.

Figure 10:
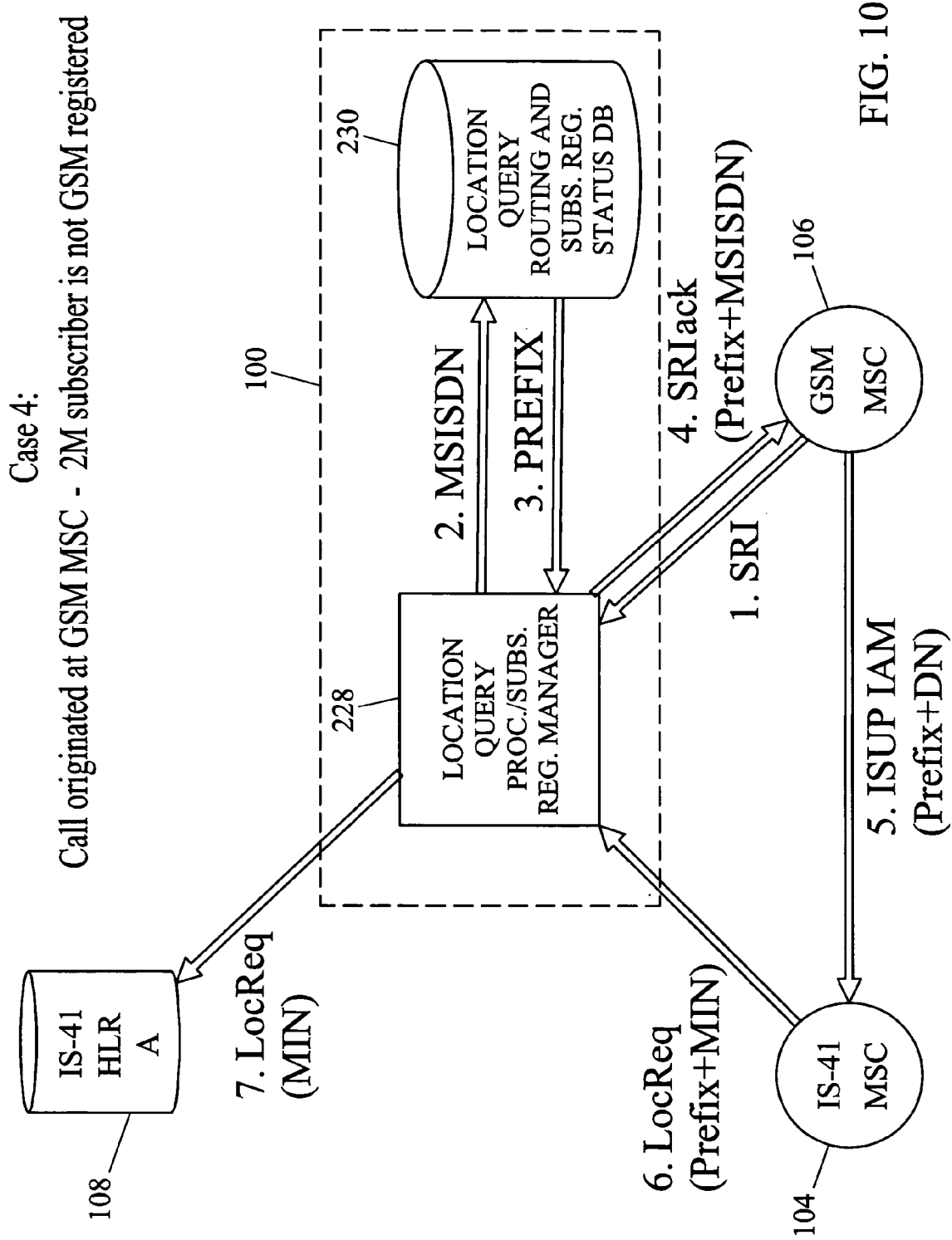
FIG. 10 is a message flow diagram illustrating exemplary messages involved in a call originated at a GSM MSC for a dual mode subscriber who is not GSM registered according to an embodiment of the present invention.

FIG. 10 is a message flow diagram illustrating exemplary messages associated with call originating at a GSM MSC for a dual mode subscriber who is not GSM registered. Referring to FIG. 10, GSM MSC 106 initiates a send routing information message. The send routing information message arrives at number migration signaling platform 100. Location query processor/subscriber registration manager 228 queries database 230 using the MSISDN number in the send routing information message, determines that the subscriber is not GSM registered, and extracts a prefix corresponding to IS-41 MSC 104 from database 230. Location query processor/subscriber registration manager 228 then formulates a send routing information acknowledge message and forwards the message to GSM MSC 106. The send routing information acknowledge message includes the prefix of IS-41 MSC 104. GSM MSC 106 routes the call to IS-41 MSC 104. As discussed above, the prefix may be omitted from the location request message, and GSM MSC 106 may route the call to IS-41 MSC 104 by default.

In response to receiving the IAM message, IS-41 MSC 104 initiates a location request message with the prefix attached to the mobile identification number in the message. When number migration signaling platform 100 receives the message, location query processor/subscriber registration manager 228 queries the database using the prefix and MIN combination. The result is the address of IS-41 HLR 108. The prefix reduces the need to re-check subscriber type or registration status. However, if the prefix is omitted, the call will still be routed to the appropriate IS-41 HLR using the processing steps illustrated in FIG. 6. Location query processor/subscriber registration manager 228 inserts the appropriate IS-41 HLR address in the message, and routing function 210 routes the message to IS-41 HLR 108.

Figure 11:
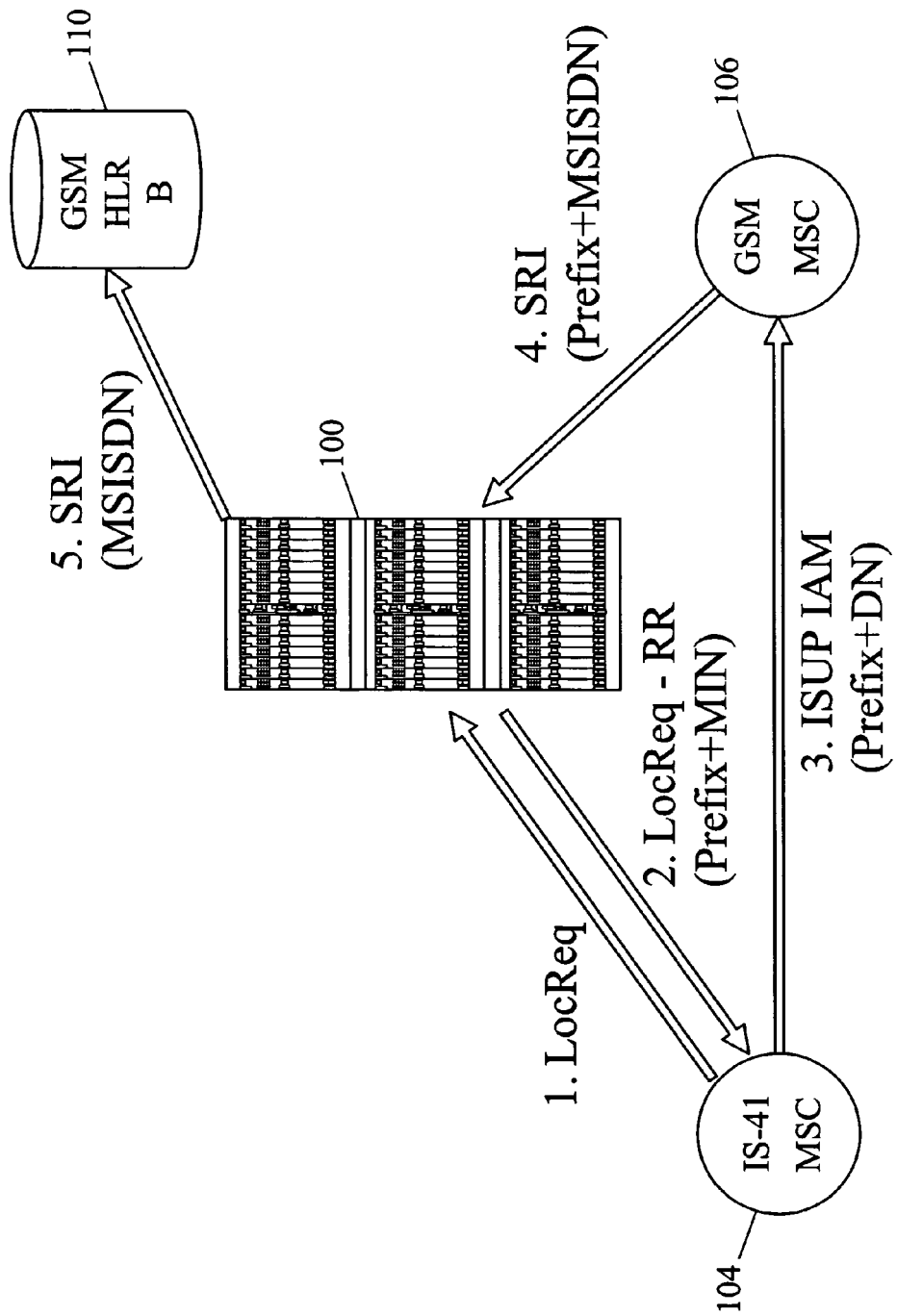
FIG. 11 is a message flow diagram illustrating exemplary messages involved in a call originated at an IS-41 MSC for a call to a GSM-only subscriber with a DN in an IS-41 range according to an embodiment of the present invention.

FIG. 11 is a message flow diagram illustrating exemplary messaging associated with a call originated at an IS-41 MSC for a GSM-only subscriber with a DN in an IS-41 range. Referring to FIG. 11, IS-41 MSC 104 formulates a location request message and forwards the location request message to number migration signaling platform 100. Number migration signaling platform 100 performs a lookup in database 230 and determines that the subscriber is a migrated GSM-only subscriber with a DN in an IS-41 range. Accordingly, number migration signaling platform 100 formulates location request return result with an optional special prefix added to the MIN indicating to MSC 104 to route the call to GSM MSC 106. IS-41 MSC 104 receives the location request return result message and routes the call to GSM MSC 106 by sending an ISUP IAM message to GSM MSC 106. In response to the ISUP IAM message, GSM MSC 106 formulates a send routing information message including the optional prefix and forwards the message to number migration signaling platform 100. Number migration signaling platform 100 performs a lookup in database 230, extracts the GSM HLR address corresponding to the prefix, and routes the SRI message to GSM HLR 110.

Figure 12:
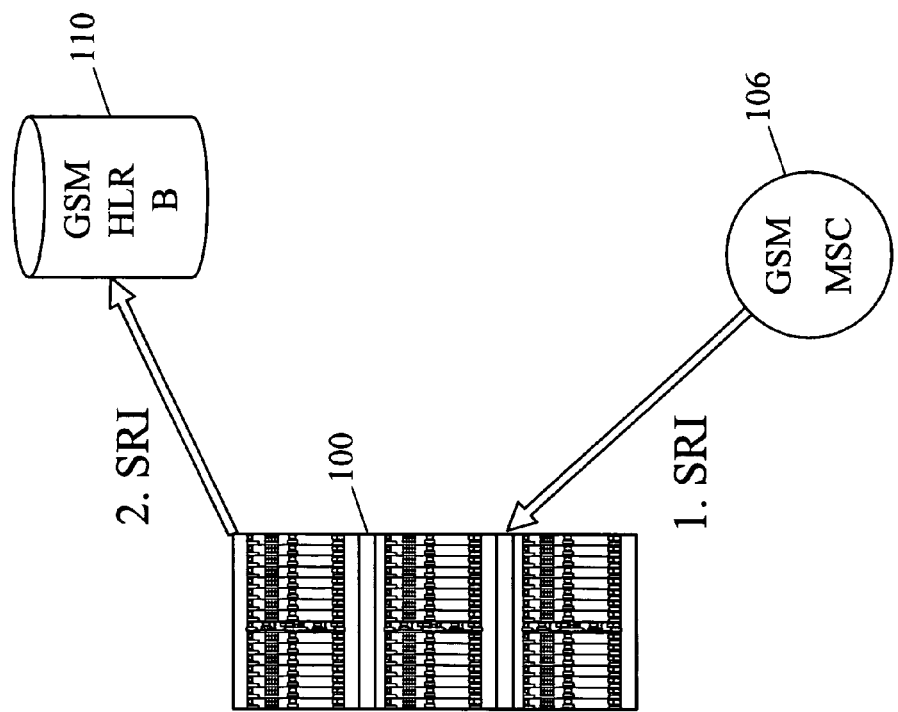
FIG. 12 is a message flow diagram illustrating exemplary messages associated with a call originated at a GSM MSC for a GSM-only subscriber with a DN within or outside of an IS-41 range according to an embodiment of the present invention.

FIG. 12 is a message flow diagram illustrating exemplary messaging associated with a call originating at a GSM MSC for a GSM subscriber with a DN in an IS-41-only range or outside of an IS-41 range. Referring to FIG. 12, GSM MSC 106 originates an SRI message and forwards the message to number migration signaling platform 100. Number migration signaling platform 100 performs a lookup in database 230, determines that the subscriber is a GSM subscriber, extracts the GSM HLR address, and routes the message to GSM HLR 110.

Figure 13:
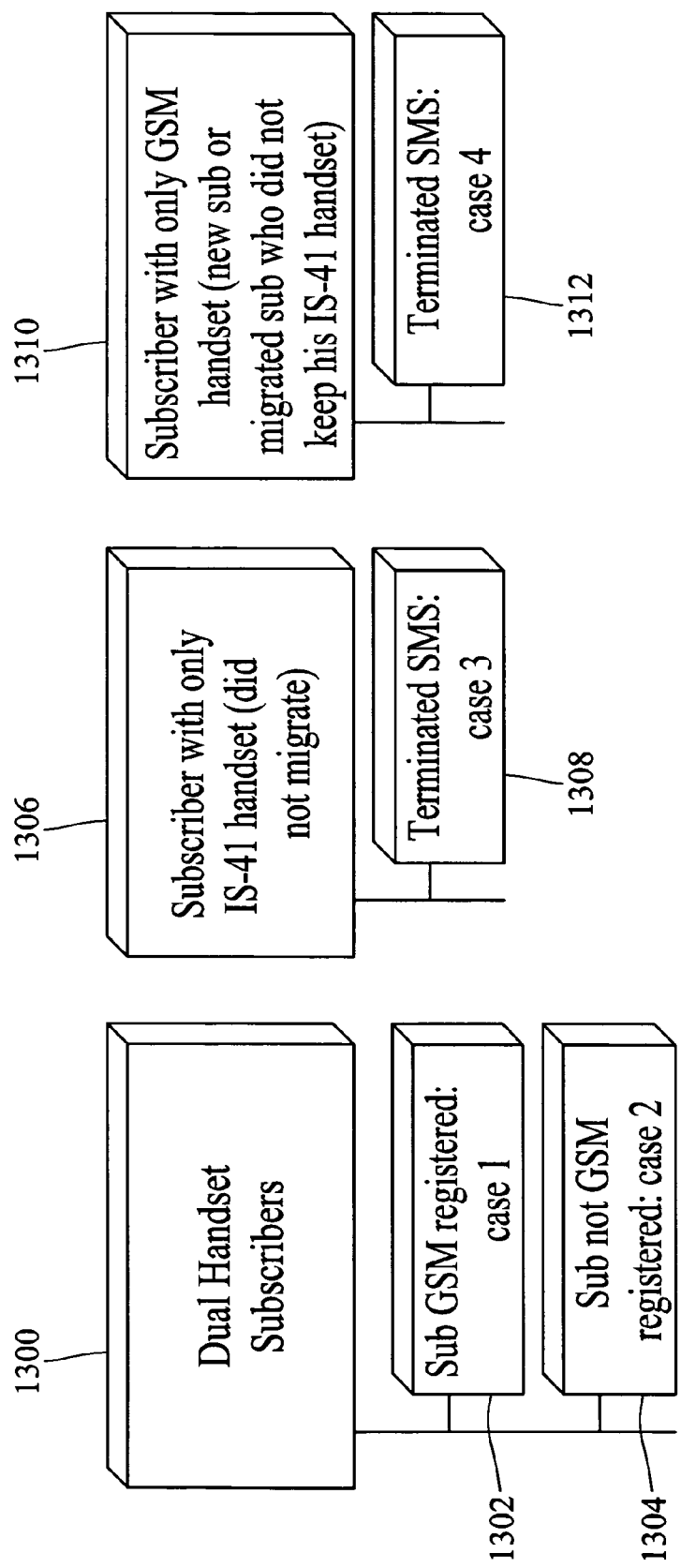
FIG. 13 is a block diagram illustrating exemplary mobile terminated SMS transactions that may be processed by a number migration signaling platform according to an embodiment of the present invention.
Figure 14:
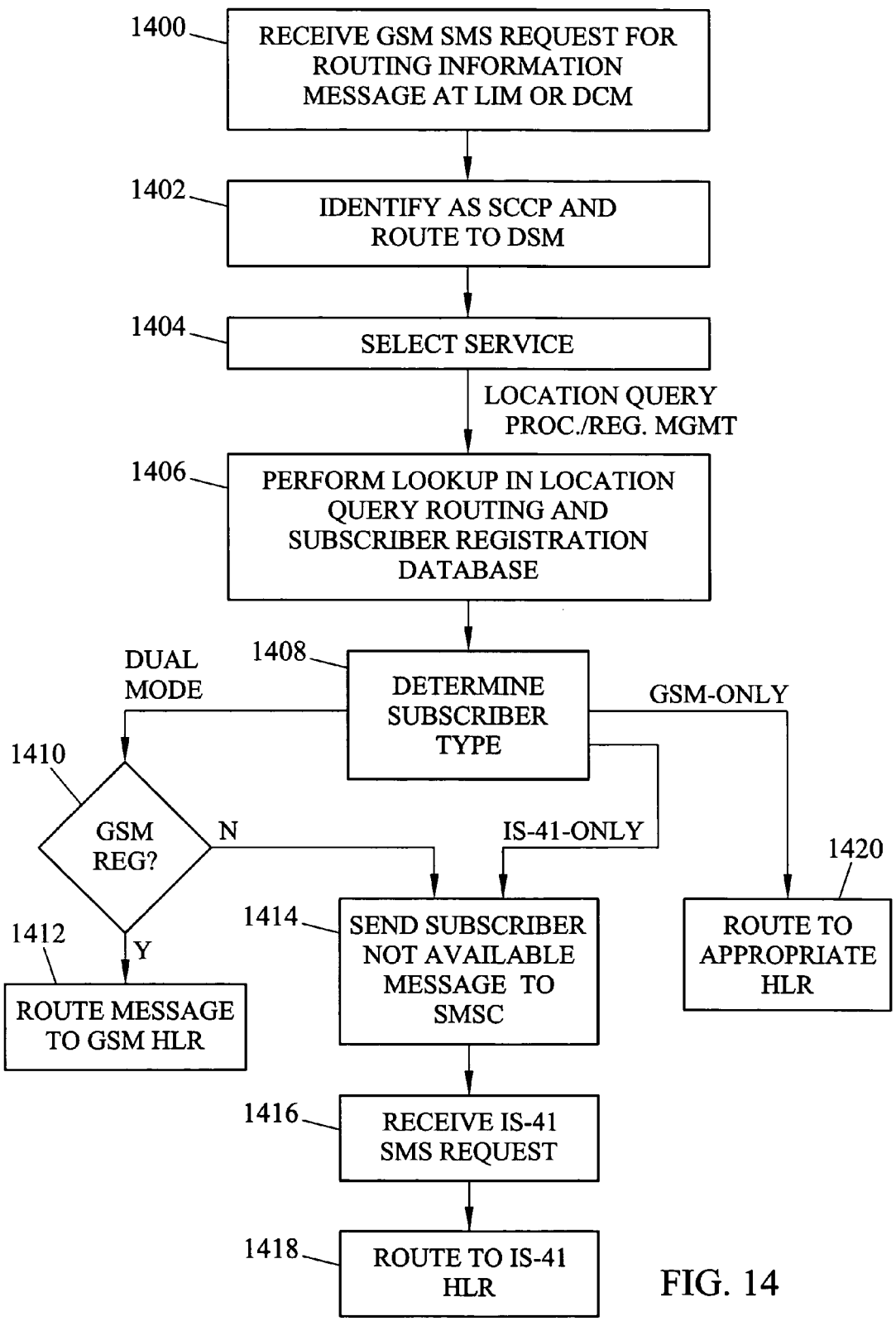
FIG. 14 is a flow chart illustrating exemplary steps that may be performed by a number migration signaling platform in processing SMS location query messages according to an embodiment of the present invention.

In addition to routing messages relating to mobile terminated calls, number migration signaling platform 100 is also capable of routing messages relating to mobile terminated SMS messages in a network with dual mode subscribers. FIG. 13 is a block diagram illustrating exemplary overall processing that may be performed by number migration signaling platform 100 for mobile terminated SMS transactions. Referring to FIG. 14, block 1300 represents the processing category for dual mode subscribers. Within this category, the subscriber may be GSM registered, as indicated by block 1302 or not GSM registered as indicated by block 1304. Category 1306 represents subscribers with IS-41 handsets who have not migrated. Within this category, registration status is irrelevant, and processing occurs according to mobile terminated SMS procedures of the present invention, as indicated by block 1308. Finally, block 1310 represents GSM-only subscribers with directory numbers both within and outside of GSM ranges. Within this category, registration status is likewise irrelevant. Accordingly, block 1312 represents the processing performed by the present invention for this category.

FIG. 14 is a flow chart illustrating exemplary steps that may be performed in processing SMS routing request messages relating to the various subscriber types illustrated in FIG. 13 Referring to FIG. 14, in step 1400, number migration signaling platform 100 receives a GSM SMS request for routing information message at LIM 200 or DCM 214. In this example, it is assumed that SMSCs 112 first send only GSM requests for routing information independently of the originating mobile subscriber type. In step 1402, the message is identified as an SCCP message and routed to DSM 224. In step 1404, service selection module 226 selects a service type for the message. In this example, it is assumed that the service type is location query processing/registration management. Accordingly, in step 1406, location query processor/subscriber registration manager 228 performs a lookup in database 230 using the MSISDN number in the SMS location query message. In step 1408, location query processor/subscriber registration manager 228 determines the subscriber type. If the subscriber is a dual mode subscriber, control proceeds to step 1410 where it is determined whether the subscriber is GSM registered. If the subscriber is GSM registered, in step 1412, location query processor/subscriber registration manager 228 inserts the address of the GSM HLR in the message and routes the message to the appropriate GSM HLR.

In step 1410, if the subscriber is not GSM registered, control proceeds to step 1414, where location query processor/subscriber registration manager 228 sends a subscriber not available message to the originating short message service center. The short message service center formulates an IS-41 SMS request message. In step 1416, number migration signaling platform 100 receives the IS-41 SMS request. In step 148, number migration signaling platform 100 routes the IS-41 SMS request to an IS-41 HLR.

Referring back to step 1408, if the subscriber is determined to be a GSM-only subscriber, control proceeds to step 1420 where the message is routed to the appropriate GSM HLR.

Returning again to step 1408, if the subscriber is determined to be an IS-41-only subscriber, control proceeds to step 1414 where number migration signaling platform 100 sends a subscriber not available message to the originating short message service center. In response, the short message service center initiates an IS-41 SMS request. In step 1416 number migration signaling platform 100 receives the SMS request. In step 1418, number migration signaling platform 100 routes the SMS request to the IS-41 HLR.

Figure 15:
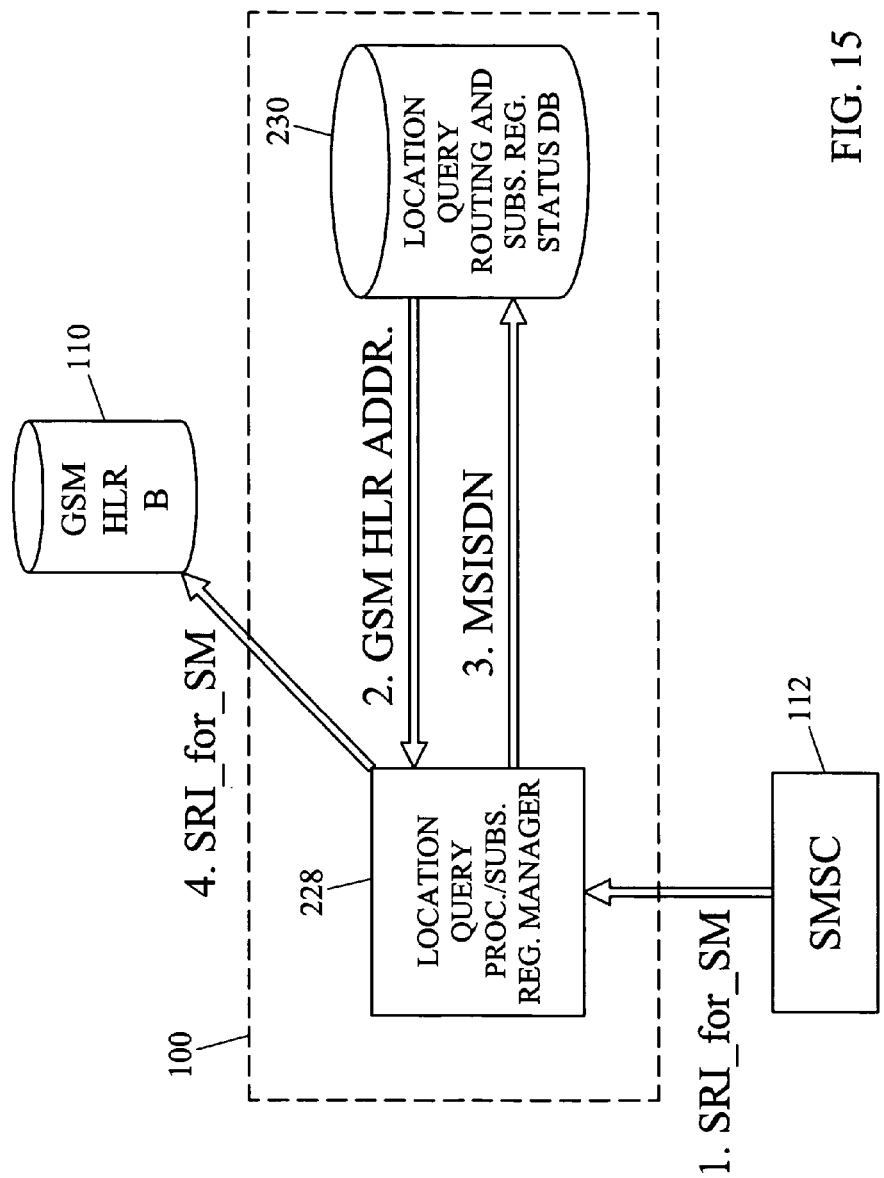
FIG. 15 is a message flow diagram illustrating exemplary messages associated with an SMS location query transaction for a GSM registered dual mode subscriber according to an embodiment of the present invention.

FIGS. 15-18 are message flow diagrams illustrating exemplary messages associated with mobile terminated SMS transactions. Referring to FIG. 15, the case is illustrated where a mobile terminated SMS message for a GSM registered dual mode subscriber is sent to number migration signaling platform 100. In FIG. 15, short message service center 112 initiates an SRI_for_SM message and forwards the message to number migration signaling platform 100. Within number migration signaling platform 100, location query processor/subscriber registration manager 228 queries database 230 using the MSISDN number in the SRI_for_SM message and identifies the subscriber as being a dual mode, GSM registered subscriber. Accordingly, location query processor/subscriber registration manager 228 extracts the HLR address for the GSM HLR to which the message should be routed, inserts the address in the message, and routing function 210 routes the message to GSM HLR 110.

Figure 16:
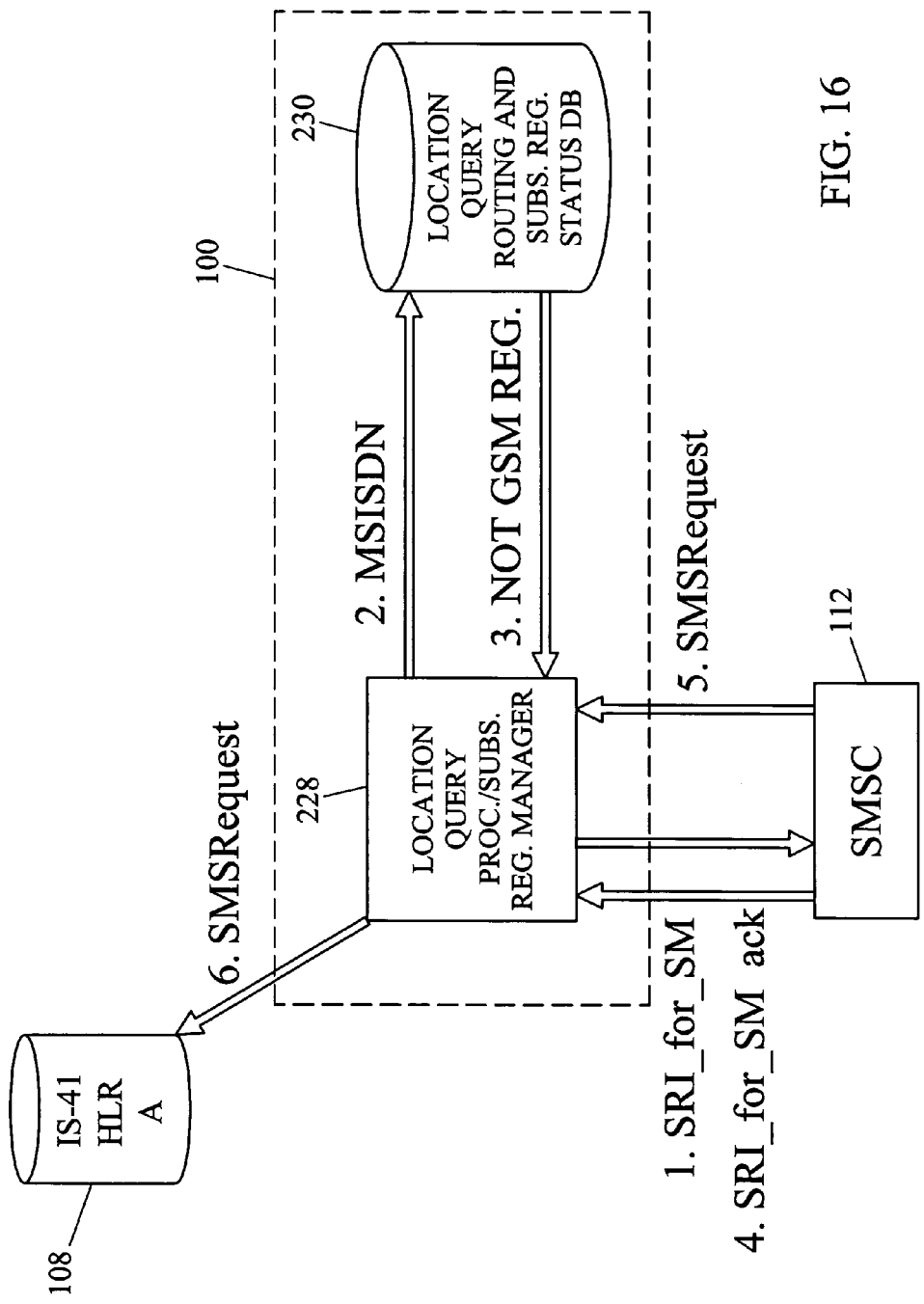
FIG. 16 is a message flow diagram illustrating exemplary messages associated with a mobile terminated SMS location query transaction for a dual mode subscriber who is not GSM registered according to an embodiment of the present invention.

FIG. 16 illustrates the case for a mobile terminated SMS message for a dual mode subscriber who is not GSM registered. Referring to FIG. 16, SMSC 112 sends a SRI_for_SM message to number migration signaling platform 100. Within number migration signaling platform 100, location query processor/subscriber registration manager 228 queries database 230 using the MSISDN number in the message, and determines that the subscriber is not GSM registered. Accordingly, location query processor/subscriber registration manager 228 formulates a send routing information for short message acknowledge message indicating that the subscriber is not available and forwards the message to SMSC 112. Upon receiving this message, SMSC 112 generates an IS-41 SMS request message and sends the message to number migration signaling platform 100. Number migration signaling platform 100 routes the SMS message to the appropriate HLR without re-checking subscriber registration status.

Figure 17:
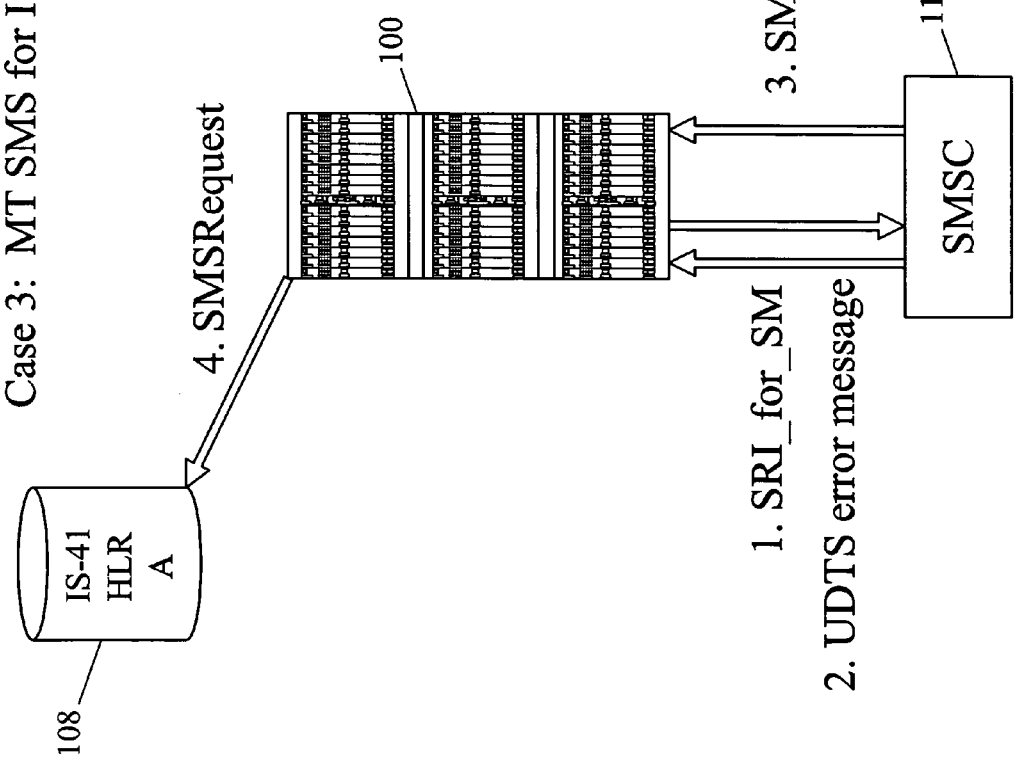
FIG. 17 is a message flow diagram illustrating exemplary messages associated with a mobile terminated SMS location query transaction for a non-migrated IS-41 subscriber according to an embodiment of the present invention.

FIG. 17 illustrates exemplary messaging for the case of a mobile terminated SMS message for an IS-41, non-migrated subscriber. Referring to FIG. 17, SMSC 112 sends an SRI_for_SM message to number migration signaling platform 100. Number migration signaling platform 100 performs a lookup in database 230 using the MSISDN in the SRI_for_SM message and determines that an entry does not exist for the IS-41 subscriber. Number migration signaling platform 100 formulates a UDTS error message indicating that an entry was not present and sends the message to SMSC 112. In response, SMSC 112 generates an IS-41 SMS request and forwards the SMS request and forwards the message to number migration signaling platform 100. Number migration signaling platform 100 extracts the address of the appropriate IS-41 HLR using the MIN in the SMS request message and routes the SMS request message to IS-41 HLR 108.

Figure 18:
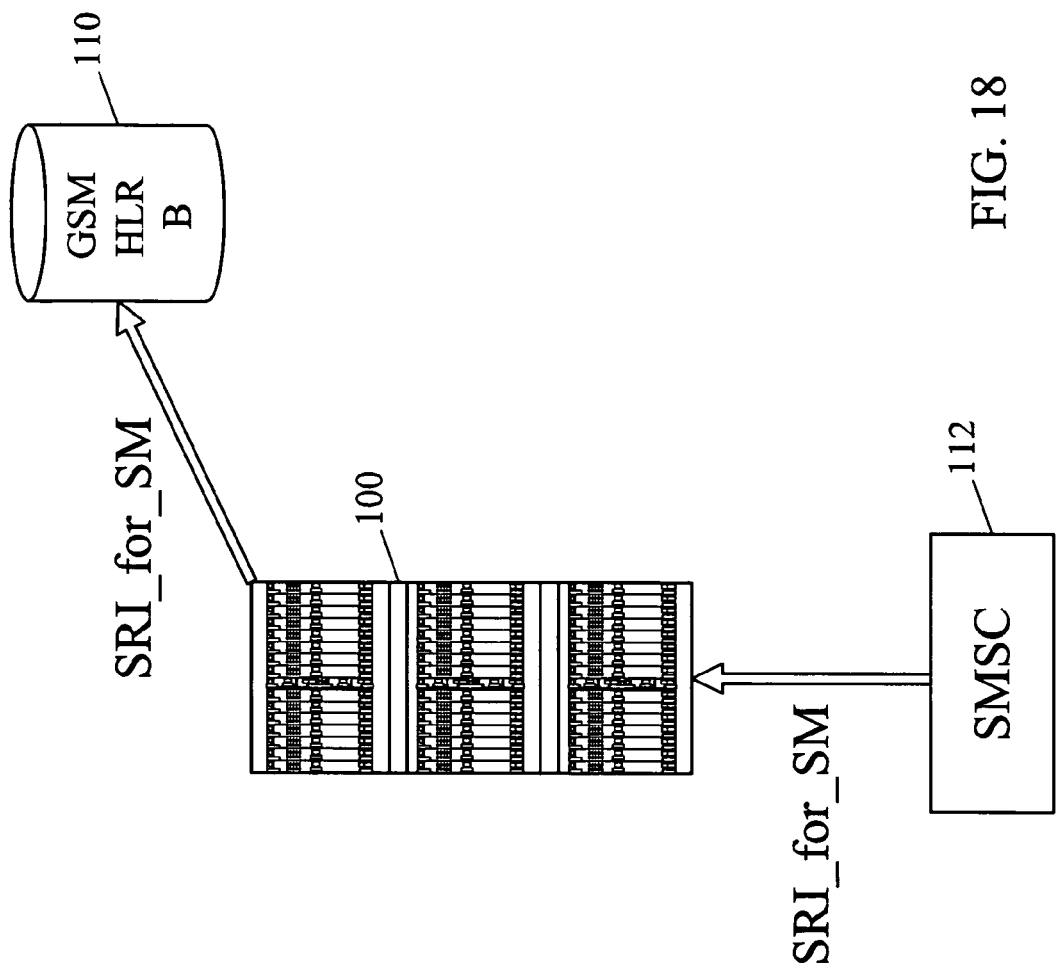
FIG. 18 is a message flow diagram illustrating exemplary messages associated with an SMS location query transaction for a GSM-only subscriber according to an embodiment of the present invention.

FIG. 18 is a signaling message flow diagram illustrating exemplary messaging for the case of a mobile terminated SMS transaction for a GSM-only subscriber. Referring to FIG. 18, SMSC 112 generates an SRI_for_SM message and sends the message to number migration signaling platform 100. Number migration signaling platform 100 determines the HLR to which the message should be routed and forwards the message to HLR 110.

Figure 19:
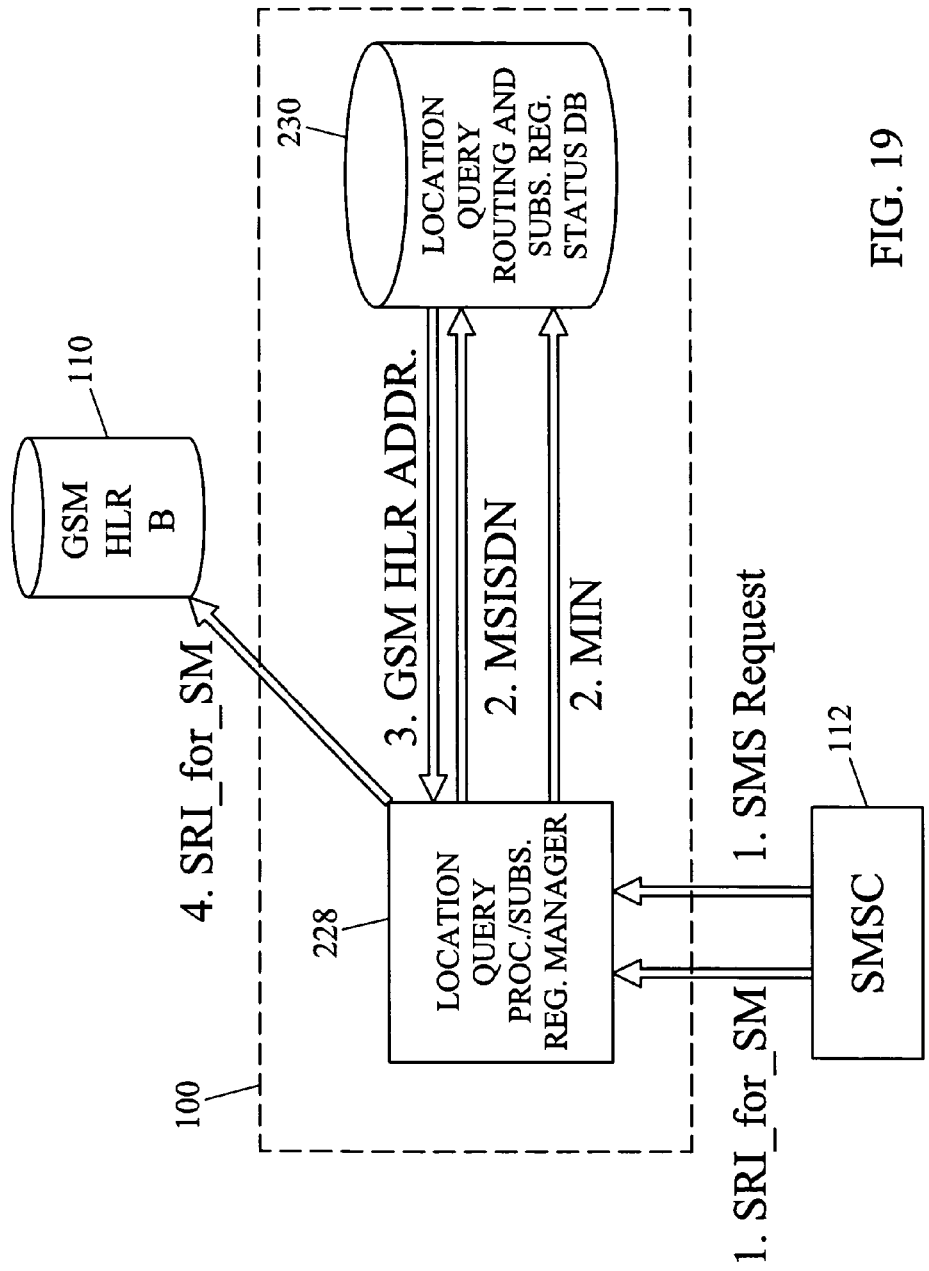
FIG. 19 is a message flow diagram illustrating exemplary messaging for a mobile terminated SMS location query transaction for a GSM registered subscriber according to an alternate embodiment of the present invention.

In FIGS. 15-18, it is assumed that SMSC 112 first formulates a GSM SRI_for_SM message independently of the mobile originating subscriber type. In an alternate embodiment of the invention, SMSC 112 may formulate both a GSM SRI_for_SM message and an IS-41 SMS Request message for each mobile terminated SMS transaction. FIG. 19 is a message flow diagram illustrating exemplary signaling associated with a mobile terminated SMS message for a GSM registered dual mode subscriber. Referring to FIG. 19, SMSC 112 simultaneously generates SRI_for_SM and SMS Request messages. Number migration signaling platform 100 receives both messages and location query processor/subscriber registration manger 228 queries the database and locates entries corresponding to the MSISDN and the MIN. However, because the subscriber is GSM registered, location query processor/subscriber registration manager 228 extracts only the GSM HLR address from database 230. In this case, location query processor/subscriber registration manager 228 inserts the address corresponding to the GSM HLR in the SRI message, and routing function 210 routes the message to GSM HLR 110.

Figure 20:
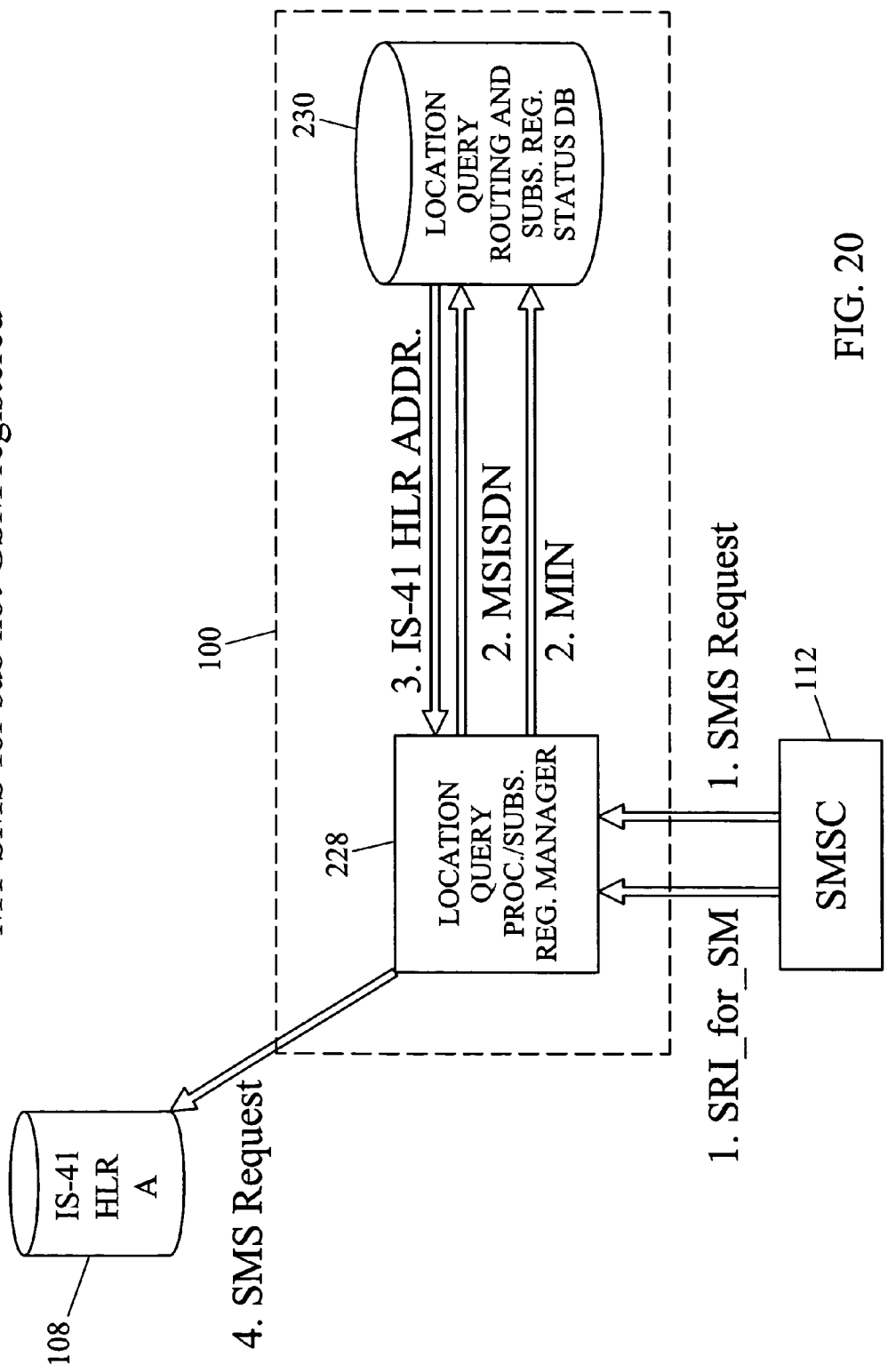
FIG. 20 is a message flow diagram illustrating exemplary messaging for a mobile terminated SMS location query transaction for a subscriber who is not GSM registered according to an alternate embodiment of the present invention.

FIG. 20 illustrates exemplary messaging associated with the mobile terminated SMS transaction for a subscriber who is not GSM registered. Referring to FIG. 20, SMSC 112 simultaneously formulates SRI_for_SM and SMS request messages in response to a request by a subscriber to deliver an SMS message. Number migration signaling platform 100 receives the messages and formulates two queries to database 230. Because the subscriber is not GSM registered, location query processor/subscriber registration manager 228 extracts only the IS-41 HLR address. Location query processor/subscriber registration manager 228 inserts the address for IS-41 HLR 108 in the message, and routing function 210 routes the message to IS-41 HLR 108.

Figure 21:
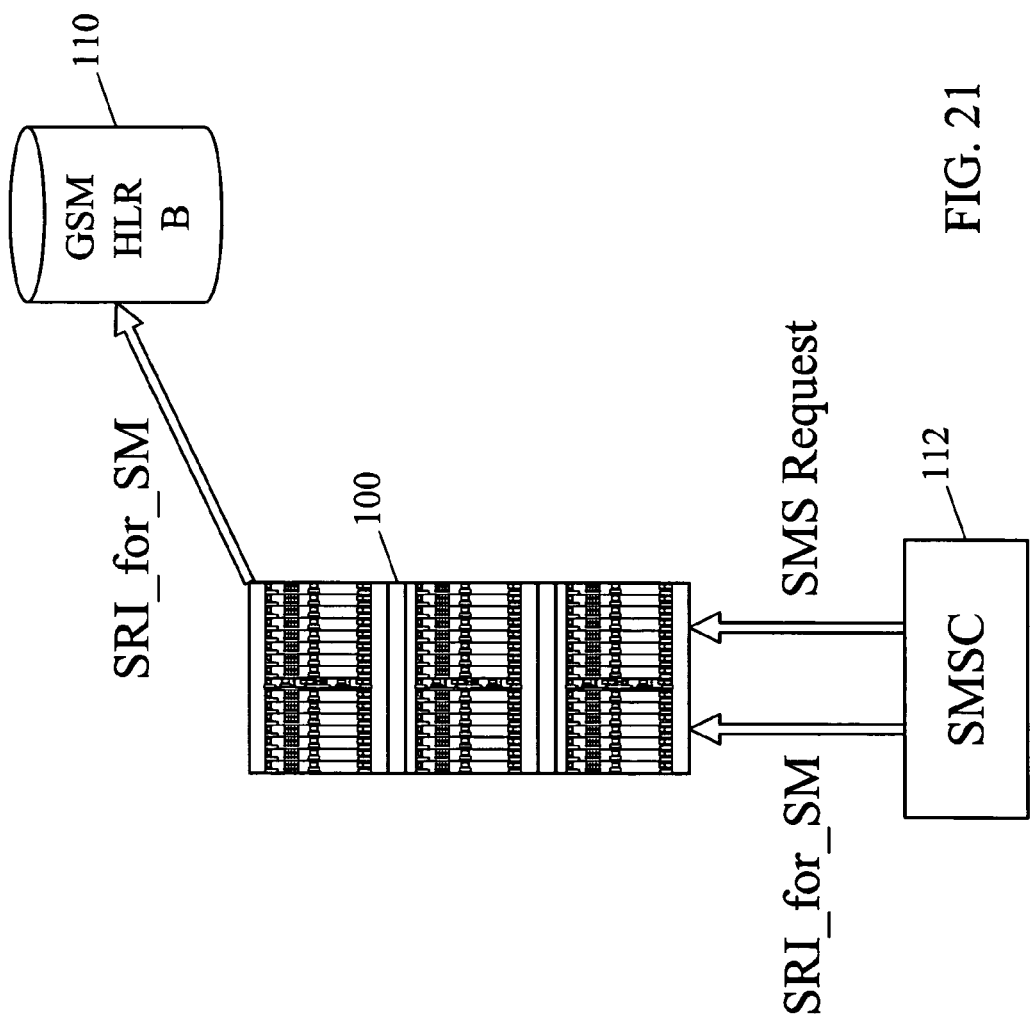
FIG. 21 is a message flow diagram illustrating exemplary messaging for a mobile terminated SMS location query transaction for a GSM-only subscriber according to an alternate embodiment of the present invention.

FIG. 21 illustrates exemplary messaging associated with the mobile terminated SMS transaction for a new GSM-only subscriber. Referring to FIG. 21, SMSC 112 simultaneously formulates SRI_for_SM and SMS request messages. Number migration signaling platform 100 receives the messages and performs a lookup in database 230. However, only SR_for_SM message results in a match in database 230 because the DN in the SRI_for_SM message is within a GSM-only range. Accordingly, location query processor/subscriber registration manager 228 inserts the address of GSM HLR 110 in the message, and routing function 210 routes the message to GSM HLR 110.

Figure 22:
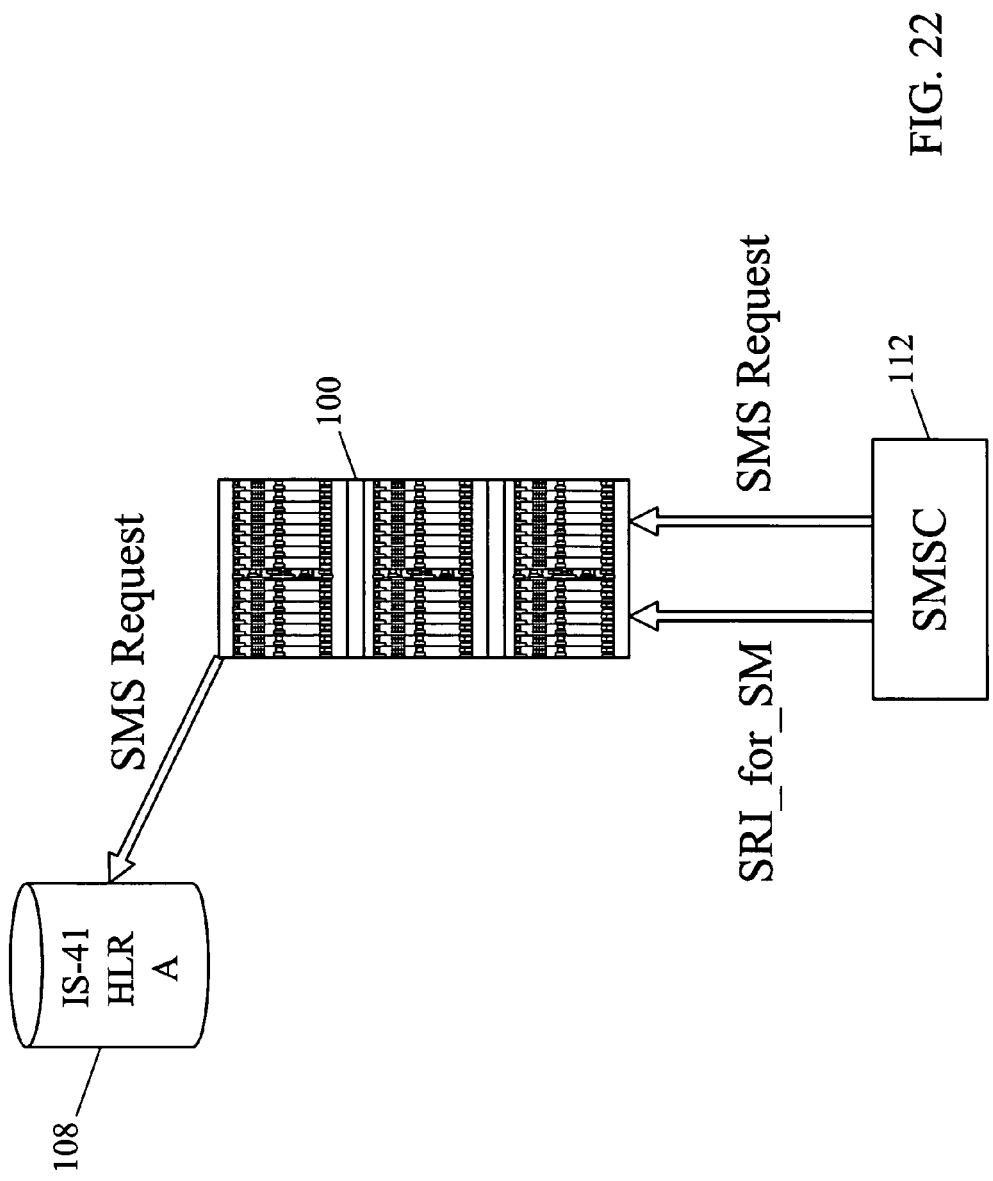
FIG. 22 is a message flow diagram illustrating exemplary messaging for a mobile terminated SMS location query transaction for a non-migrated IS-41 subscriber according to an alternate embodiment of the present invention.

FIG. 22 illustrates exemplary messaging associated with a mobile terminated SMS transaction for a non-migrated IS-41 subscriber. Referring to FIG. 22, SMSC 112 simultaneously formulates SRI_for_SM and SMS request messages. Number migration signaling platform 100 receives both messages and queries database 230 based on both messages. The SMS request message results in a match in database 230 because the DN in the message is within an IS-41 only range. Accordingly, location query processor/subscriber registration manager 228 inserts the address of IS-41 HLR 108 in the message, and routing function 210 routes the message to IS-41 HLR 108.

Figure 23:
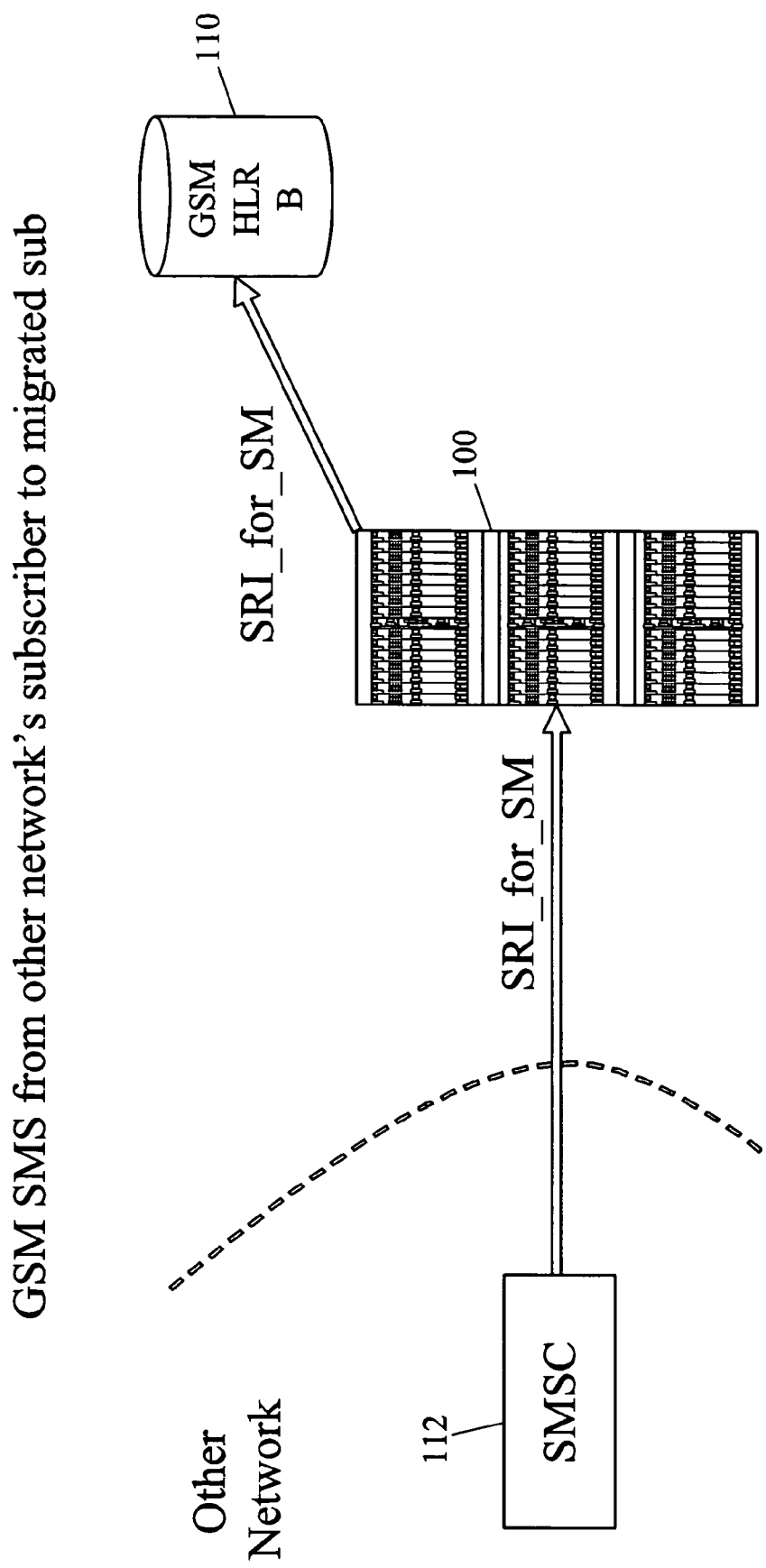
FIG. 23 is a message flow diagram illustrating exemplary messaging for a GSM SMS location query transaction from another network to a migrated subscriber according to an embodiment of the present invention.

FIG. 23 illustrates exemplary messaging associated with an SRI message from a non-home SMSC. Referring to FIG. 23, non-home SMSC 112 sends an SRI_for_SM message to number migration signaling platform 100. In response to receiving this message, number migration signaling platform 100 determines whether the message originated from a home SMSC. In this example, it is assumed that the message did not originate from a home SMSC. Accordingly, subscriber registration status is not checked. A lookup is simply performed in database 230, and the routing address for GSM HLR 110 is extracted. The message is then routed to GSM HLR 110.

In the examples illustrated in FIGS. 15-23, it is assumed that the SMSCs are dual mode SMSCs capable of initiating SMS location query and other signaling messages in either of the application layer mobile signaling protocols. However, the present invention is not limited to use in such an environment. In some networks, there may be separate SMSCs for each application layer mobile signaling protocol. In such a network environment, a number migration signaling platform of the present invention would operate using the same processing steps illustrated in FIG. 14. For example, when number migration signaling platform 100 receives an IS-41 SMS location query message from an IS-41 SMSC for a GSM registered subscriber, number migration signaling platform 100 preferably returns a message to the IS-41 MSC indicating that the subscriber is not reachable. In response to this message, the IS-41 MSC may send the SMS message to a GSM SMSC via the SMPP protocol. The GSM MSC would then send a GSM SMS location query message to number migration signaling platform 100. Number migration signaling platform 100 would route the GSM location query message to the appropriate GSM HLR. If a GSM SMSC originates a GSM SMS location query message for a subscriber who is not GSM registered, number migration signaling platform 100 may return a response to the GSM SMSC indicating the subscriber is not reachable. The GSM SMSC may then send the SMS message to an IS-41 SMSC via the SMPP protocol. The IS-41 SMSC may then initiate an SMS location query message. Number migration signaling platform 100 would then route the IS-41 SMS location query message to the appropriate IS-41 HLR. If number migration signaling platform 100 receives a location query message from an IS-41 SMSC for a subscriber who is not GSM registered or from a GSM SMSC for a subscriber who is GSM registered, number migration signaling platform 100 simply routes the SMS location query message to the appropriate HLR.

Thus, as described above, the present invention is capable of routing messages to the appropriate destination and for rerouting calls in a network that includes dual mode subscribers, migrated subscribers, new subscribers of the migrated-to signaling protocol, and existing subscribers of the migrated-from signaling protocol that do not switch application layer mobile signaling protocols. In addition, in dual mode, dual handset networks, because the present invention preferably tracks the registration status of one application layer mobile signaling protocol for dual mode subscribers, one application layer mobile signaling protocol can be given priority over the other application layer mobile signaling protocol. In dual mode, single handset networks, because the present invention preferably tracks the registration status of both application layer mobile signaling protocols for dual mode subscribers, messages are routed to the destination node of the appropriate type.

While the examples above relate primarily to IS-41 and GSM signaling protocols, the present invention is not limited to these protocols. The methods and systems for processing and routing signaling messages described herein are applicable to any network in which subscribers use multiple application layer mobile signaling protocols with the same DN.

In addition, in the examples described above, SS7 and IP links are used to carry the application layer mobile signaling protocols. However, the present invention is not limited to using SS7 or IP transport. The methods and systems described herein for facilitating migration between application layer mobile signaling protocols may be used with any underlying transport capable of carrying an application layer mobile signaling protocol. Additional examples, other than IP and SS7, include any of the transport protocols specified for third generation mobile telecommunications networks, for example, as described in the various technical documents available at www.3gpp.org.

In some of the call flows described above, such as those illustrated in FIGS. 15-23, registration status for dual-mode subscribers is tracked and the tracked registration status is used to route location query messages to the correct HLR for providing SMS service to the subscriber. However, the present invention is not limited to tracking the registration status of a dual mode subscriber and using the tracked registration status to deliver SMS service. For example, additional services, such as intelligent network (IN) and customized application of mobile enhanced logic (CAMEL) services, may be provided to dual handset subscribers using the methods and systems for tracking the registration status of the subscribers as described herein. In one implementation, the registration status of a dual mode subscriber may be tracked as described above. An IN or CAMEL services node may generate a message intended to deliver an IN or CAMEL service to the subscriber if the subscriber is registered in a particular mode. For example, such services may be provided to GSM subscribers but not to IS-41 subscribers or vice versa. In such a situation, the subscriber's registration status may be checked. If the subscriber is registered according to protocol corresponding to the service, the message may be routed to a node for providing the particular service to the subscriber. If the subscriber is not registered in the protocol corresponding to the service, the message may be discarded. In this manner, the present invention uses the tracked registration status of dual mode subscribers to deliver supplementary services in addition to SMS.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for routing short message service (SMS) messages in a network in which subscribers have subscriptions of both first and second application layer mobile signaling protocols concurrently and use the same directory number for both application layer mobile signaling protocols, the method comprising:
   (a) receiving, at a short message service center (SMSC), an SMS message to be delivered to a subscriber of both the first and second application layer mobile signaling protocols concurrently;
   (b) sending, from the SMSC, a request for SMS routing information in the first application layer mobile signaling protocol, the request for SMS routing information including a directory number corresponding to the subscriber of both the first and second application layer mobile signaling protocols;
   (c) at a node distinct from a home location register (HLR), a visitor location register (VLR), and the SMSC, receiving the request for SMS routing information and determining whether the subscriber is registered according to the first application layer mobile signaling protocol or the second application layer protocol; and
   (d) in response to determining that the subscriber is registered according to the first application layer mobile signaling protocol, routing the request for SMS routing information from the node to an HLR of the first application layer mobile signaling protocol.

2. The method of claim 1 wherein the first application layer mobile signaling protocol includes the Interim Standard-41 (IS-41) protocol and the second application layer mobile signaling protocol includes the Global System for Mobile communications (GSM) protocol.

3. The method of claim 1 wherein the first application layer mobile signaling protocol includes the Global System for Mobile communications (GSM) protocol and the second application layer mobile signaling protocol includes the Interim Standard-41 (IS-41) protocol.

4. The method of claim 1 wherein sending a request for SMS routing information in the first application layer mobile signaling protocol includes sending a request for SMS routing information in the first application mobile signaling protocol independently of the origin of the SMS message.

5. The method of claim 1 wherein performing a lookup in a database distinct from an HLR or a VLR includes performing a lookup in a database operatively associated with a signaling transfer point (STP).

6. The method of claim 1 comprising in response to determining that the subscriber is not registered according to the first application layer mobile signaling protocol, performing one of:
   (a) formulating and sending a response to the SMSC indicating that the subscriber is not reachable; and
   (b) formulating and sending a request for SMS routing information from the node to an HLR of the second application layer mobile signaling protocol.

7. The method of claim 6 wherein, in response to determining that the subscriber is not registered according to the first application layer mobile signaling protocol, performing the step of formulating and sending a response to the SMSC indicating that the subscriber is not reachable, wherein the SMSC, in response to receiving the subscriber not reachable message, formulates and sends a request for SMS routing information in the second application layer mobile signaling protocol.

8. The method of claim 7 comprising, in response to receiving the subscriber not reachable message, formulating and sending from the SMSC, a short message peer-to-peer (SMPP) message to an SMSC of the second application layer mobile signaling protocol.

9. The method of claim 1 comprising, concurrently with step (b), sending, from the SMSC, a request for SMS routing information in the second application layer mobile signaling protocol, the request for SMS routing information including the directory number corresponding to the subscriber of both the first and second application layer mobile signaling protocols.

10. The method of claim 9 comprising, in response to the subscriber being registered according to the first application layer mobile signaling protocol, routing the request for SMS routing information in the first application mobile signaling protocol to an HLR of the first application layer mobile signaling protocol.

11. The method of claim 9 comprising, in response to the subscriber not being registered according to the first application layer mobile signaling protocol, routing the request for SMS routing information in the second application layer mobile signaling protocol to an HLR of the second application layer mobile signaling protocol.

12. A number migration signaling platform comprising:
   (a) a communications link module for receiving messages from a communications link and for identifying messages that require processing prior to final routing;
   (b) a location query routing and subscriber registration status database operatively associated with the communications link module for storing registration status information in a first application layer mobile signaling protocol for subscribers of both first and second application layer mobile signaling protocols concurrently; and
   (c) a location query processor and subscriber registration manager operatively associated with the location query routing and subscriber registration status database for receiving the messages that require processing prior to final routing, for tracking the registration status in the first application layer mobile signaling protocol for subscribers of the first application layer mobile signaling protocol, subscribers of the second application layer mobile signaling protocol, and subscribers of both the first and second application layer mobile signaling protocols in the location query routing and subscriber registration status database and for routing signaling messages for calls and short message service (SMS) messages to the appropriate destinations based on the tracked registration status, wherein the messages that require processing prior to final routing include location query messages, wherein the number migration signaling platform comprises a node separate from a home location register (HLR), a visitor location register (VLR), and a short message service center (SMSC), and wherein the number migration signaling platform routes the location query messages to HLRs based on the tracked registration status.

13. The number migration signaling platform of claim 12 wherein the communications link module comprises an SS7 communications link module.

14. The number migration signaling platform of claim 12 wherein the communications link module comprises an Internet protocol (IP) communications link module.

15. The number migration signaling platform of claim 12 wherein the first application layer mobile signaling protocol comprises the Interim Standard-41 (IS-41) protocol and the second application layer mobile signaling protocol comprises the Global System for Mobile communications (GSM) protocol and wherein the location query processor and subscriber registration manager is adapted to track only the IS-41 registration status.

16. The number migration signaling platform of claim 12 wherein the first application layer mobile signaling protocol comprises the Global System for Mobile communications (GSM) protocol and the second application layer mobile signaling protocol comprises the Interim Standard-41 (IS-41) protocol and wherein the location query processor and subscriber registration manager is adapted to track only the GSM registration status.

17. The number migration signaling platform of claim 12 wherein the first application layer mobile signaling protocol comprises the Global System for Mobile communications (GSM) protocol and the second application layer mobile signaling protocol comprises the Interim Standard-41 (IS-41) protocol and wherein the location query processor and subscriber registration manager is adapted to track both the GSM and IS-41 registration status.

18. The number migration signaling platform of claim 12, wherein, in response to receiving a location query message from a mobile switching center (MSC) of the first application layer mobile signaling protocol relating to a mobile subscriber being registered according to the first application layer mobile signaling protocol, the location query processor and subscriber registration manager is adapted to route the location query message to a home location register of the first application layer mobile signaling protocol.

19. The number migration signaling platform of claim 12 wherein, in response to receiving a location query message from a mobile switching center (MSC) of the first application layer mobile signaling protocol relating to a mobile subscriber who is not registered according to the first application layer mobile signaling protocol, the location query processor and subscriber registration manager is adapted to formulate a response to the location query message.

20. The number migration signaling platform of claim 19 wherein the response includes a prefix corresponding to an MSC of the second application layer mobile signaling protocol.

21. The number migration signaling platform of claim 12 wherein, in response to receiving a location query message from a mobile switching center (MSC) of the second application layer mobile signaling protocol for a subscriber being registered according to the first application layer mobile signaling protocol, the location query processor and subscriber registration manager is adapted to send a response to the mobile switching center of the second application layer mobile signaling protocol.

22. The number migration signaling platform of claim 21 wherein the response includes a prefix corresponding to the MSC of the first application layer mobile signaling protocol.

23. The number migration signaling platform of claim 12 wherein, in response to receiving a location query message from a mobile switching center of the second application layer mobile signaling protocol for a subscriber who is not registered according to the first application layer mobile signaling protocol, the location query processor and subscriber registration manager is adapted to route the location query message to an HLR of the second application layer mobile signaling protocol.

24. The number migration signaling platform of claim 12 wherein the communications link module, the location query routing and subscriber registration status database, and the location query processor and subscriber registration manager comprise components of a signal transfer point (STP).

25. The number migration signaling platform of claim 12 wherein, in response to receiving a location query message from a short message service center of the first application layer mobile signaling protocol for a subscriber who is not registered according to the first application layer mobile signaling protocol, the location query processor and subscriber registration manager is adapted to return a subscriber unreachable message to the SMSC of the first application layer mobile signaling protocol for triggering the SMSC of the first application layer mobile signaling protocol to route the SMS message to an SMSC of the second application layer mobile signaling protocol.

\* \* \* \* \*